US012610028B2

(12) United States Patent
Choi et al.

(10) Patent No.: US 12,610,028 B2
(45) Date of Patent: Apr. 21, 2026

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Eunseok Choi, Suwon-si (KR); Sungho Chae, Suwon-si (KR); Byungseok Soh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 18/143,986

(22) Filed: May 5, 2023

(65) Prior Publication Data

US 2023/0276032 A1    Aug. 31, 2023

Related U.S. Application Data

(63) Continuation of application No. PCT/KR2023/000156, filed on Jan. 4, 2023.

(30) Foreign Application Priority Data

Jan. 4, 2022    (KR) ........................ 10-2022-0001074
Apr. 1, 2022    (KR) ........................ 10-2022-0041342

(51) Int. Cl.
*H04N 9/31*        (2006.01)
*G01B 11/02*        (2006.01)
(52) U.S. Cl.
CPC ........... *H04N 9/317* (2013.01); *G01B 11/026* (2013.01); *H04N 9/3185* (2013.01)
(58) Field of Classification Search
CPC .... G03B 21/14; G03B 21/142; G03B 21/145; G03B 21/147; G03B 21/208; H04N 9/31;
(Continued)

(56) References Cited

U.S. PATENT DOCUMENTS 6,520,647 B2    2/2003    Raskar
7,690,797 B2    4/2010    Higashi
(Continued)

FOREIGN PATENT DOCUMENTS

EP        1 569 447 A1    8/2005
JP        2008-287426 A    11/2008
(Continued)

OTHER PUBLICATIONS

International Search Report (PCT/ISA/210) issued Apr. 17, 2023 by the International Searching Authority in counterpart International Patent Application No. PCT/KR2023/000156.
(Continued)

*Primary Examiner* — Sultan Chowdhury
(74) *Attorney, Agent, or Firm* — Sughrue Mion, PLLC

(57)        ABSTRACT

An electronic apparatus includes a projection part, an acceleration sensor, a plurality of distance sensors arranged on one surface of the electronic apparatus facing a projection surface, a memory storing at least one instruction, and a processor, wherein the plurality of distance sensors are arranged side by side on left and right sides on one surface of the electronic apparatus, and are arranged to be rotated by a first angle to face one another, and the processor is configured to calculate a first rotation angle and a second rotation angle for the direction of gravity of the electronic apparatus based on sensing values acquired by using the acceleration sensor, calculate a third rotation angle of the electronic apparatus for the projection surface based on sensing values acquired by using the plurality of distance sensors and the first angle, and perform keystone correction based on the first to third rotation angles.

16 Claims, 19 Drawing Sheets

(58) Field of Classification Search
CPC ...... H04N 9/312; H04N 9/317; H04N 9/3141;
H04N 9/3158; H04N 9/3161; H04N
9/3164; H04N 9/3185; H04N 9/3194;
G01S 13/08; G01S 15/08; G01S 17/08;
G01P 15/18; G01B 11/026
See application file for complete search history.

(56) References Cited

U.S. PATENT DOCUMENTS

| | | | |
|---|---|---|---|
| 8,322,863 | B1 | 12/2012 | Cho et al. |
| 8,994,714 | B2 | 3/2015 | Erinjippurath et al. |
| 11,336,878 | B2 | 5/2022 | Yoon et al. |
| 2004/0252283 | A1 | 12/2004 | Ogawa |
| 2005/0012907 | A1 | 1/2005 | Inoue |
| 2005/0062939 | A1* | 3/2005 | Tamura ................ H04N 5/7416 |
| | | | 353/69 |
| 2005/0237492 | A1 | 10/2005 | Shinozaki |
| 2010/0103385 | A1 | 4/2010 | Kubota |
| 2018/0164670 | A1* | 6/2018 | Kaji ..................... H04N 9/3194 |
| 2020/0272277 | A1* | 8/2020 | Senshiki ................. G06T 11/60 |
| 2020/0310230 | A1* | 10/2020 | Liu ........................ H04N 9/315 |
| 2021/0041983 | A1* | 2/2021 | Oike .................... G06F 3/0425 |
| 2021/0314538 | A1 | 10/2021 | Yoon et al. |
| 2022/0247986 | A1 | 8/2022 | Yoon et al. |
| 2023/0037686 | A1 | 2/2023 | Choi et al. |

FOREIGN PATENT DOCUMENTS

| | | | |
|---|---|---|---|
| JP | | 4422074 B2 | 2/2010 |
| JP | | 4774826 B2 | 9/2011 |
| JP | | 4831219 B2 | 12/2011 |
| JP | | 5010202 B2 | 8/2012 |
| JP | | 2021-184042 A | 12/2021 |
| KR | 10-2008-0044654 A | | 5/2008 |
| KR | 10-2012-0137050 A | | 12/2012 |
| KR | 10-2021-0123059 A | | 10/2021 |
| KR | 10-2023-0020798 A | | 2/2023 |

OTHER PUBLICATIONS

Written Opinion (PCT/ISA/237) issued Apr. 17, 2023 by the International Searching Authority in counterpart International Patent Application No. PCT/KR2023/000156.
Communication dated Nov. 7, 2024 issued by the European Patent Office in counterpart Application No. 23737373.3.
Communication issued Feb. 27, 2026 by the Korean Ministry of Intellectual Property in Korean Patent Application No. 10-2022-0001074.
Communication issued Feb. 27, 2026 by the Korean Ministry of Intellectual Property in Korean Patent Application No. 10-2022-0041342.

* cited by examiner

FIG. 6

| Roll angle | Pitch angle | Yaw angle | |
|---|---|---|---|
| ~31 | ~41 | 51 | BEFORE KEYSTONE CORRECTION |
| ↓ | ↓ | ↓ | |
| ~30 | ~40 | ~50 | AFTER KEYSTONE CORRECTION |
| ↑ | ↑ | ↑ 52 | |
| ~32 | ~42 | | BEFORE KEYSTONE CORRECTION |

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2023/000156, filed on Jan. 4, 2023, which is based on and claims the benefit of a Korean patent application number 10-2022-0001074, filed on Jan. 4, 2022 and Korean divisional patent application number 10-2022-0041342, filed on Apr. 1, 2022, in the Korean Intellectual Property Office, in the Korean Intellectual Property Office, the disclosure of which is incorporated by reference herein in its entirety.

BACKGROUND

1. Field

The disclosure relates to an electronic apparatus and a method for controlling thereof, and more particularly, to an electronic apparatus that performs keystone correction for preventing warping of display of an image by using a plurality of sensors, and a method for controlling thereof.

2. Description of Related Art

Recently, various projectors are being utilized with the development of electronic technologies and optical technologies. A projector means an electronic apparatus that projects a light on a screen (or, a projection surface), and makes an image formed on the screen.

In the case of viewing an image by using a projector, if the projector is placed on a flat place and perpendicularly aligned to a screen, e.g., the optical axis of the projector is perpendicular to the surface of the screen, a rectangular image is displayed on the screen. When the projector is not perpendicularly aligned to the screen, the image is distorted in taking on a trapezoidal shape, i.e., warping in an up-down direction or a left-right direction, or an image in a rotated state appears on the screen. Such warping is referred to as a keystone effect.

In the past, for correcting such a keystone effect, keystone was corrected automatically by using a tilt detection sensor (an acceleration sensor, a tilt sensor) or an image sensor (a camera). For example, a conventional electronic apparatus acquired an angle of rotation (e.g., a pitch angle, a roll angle) based on the direction of gravity by using an acceleration sensor, and calculated a warped angle (e.g., a yaw angle) between the projection surface and the projector through an image acquired through an image sensor attached to the main body of the electronic apparatus, and performed keystone correction by using the calculated angle. As another example, a conventional electronic apparatus performed keystone correction after analyzing an image by using a camera included in a user terminal separate from the projector.

As described above, in the case of calculating a yaw angle through an image, a calibration process that makes the optical axis of the projector and the measurement axis of the image sensor coincide should be performed, but if an error occurs in this calibration process, a big influence is exerted on the calculation of the angle. Also, in a process of processing an image photographed at the image sensor, there is a problem that a great amount of calculation is required.

In particular, in the case of an ultra short throw beam projector that is recently being developed, the distance between the projection surface and the projector is very close, and accordingly, in order to view the entire screen with the image sensor, a camera with a wide-angle lens installed is needed. However, in this case, warping becomes severe, and thus calibration of the optical axis and the measurement axis of the image sensor is not easy, and therefore, errors increase. In the case of an ultra short throw beam projector, due to the characteristic of the product, even if only small warping is generated, an image projected on the screen is warped greatly. Therefore, precise angle measurement is required, but there is a limitation with a method using an image sensor.

SUMMARY

The disclosure was devised for addressing the aforementioned problems, and the purpose of the disclosure is in providing an electronic apparatus that can calculate a third rotation angle of the electronic apparatus for a projection surface by using a plurality of distance sensors that are arranged to be rotated to face one another on one surface of the electronic apparatus, and a method for controlling thereof.

An electronic apparatus according to an embodiment of the disclosure includes a projection part, an acceleration sensor, a plurality of distance sensors arranged on one surface of the electronic apparatus, the one surface facing a projection surface, a memory storing at least one instruction, and a processor, wherein the plurality of distance sensors are arranged side by side on left and right sides on the one surface, and are arranged to be rotated by a first angle to face one another, and the processor may calculate a first rotation angle and a second rotation angle for the direction of gravity of the electronic apparatus based on sensing values acquired by using the acceleration sensor, calculate a third rotation angle of the electronic apparatus for the projection surface based on sensing values acquired by using the plurality of distance sensors and the first angle, and perform keystone correction based on the first to third rotation angles.

Also, the processor may determine a movement of the electronic apparatus by using sensing values acquired through the acceleration sensor and the plurality of distance sensors, and based on determining that the electronic apparatus is in a stopped state, calculate the first to third rotation angles by using the acceleration sensor and the plurality of distance sensors.

In addition, the first angle may be an angle by which the plurality of distance sensors were rotated such that lights output by the plurality of distance sensors are located within the projection surface, and may be an angle by which the plurality of distance sensors were rotated such that lights output by the plurality of distance sensors intersect one another before reaching the projection surface.

Further, the plurality of distance sensors may be arranged to be rotated by a second angle in an upper direction or a lower direction to be toward the center of the projection surface.

Also, the processor may calculate a first distance between the center of the plurality of distance sensors and the center of the projection surface by using the sensing values acquired through the plurality of distance sensors, and calculate a straight distance from the center of the plurality of distance sensors to the projection surface by using the first distance and the second angle.

In addition, the processor may perform auto-focusing by moving a predetermined location of a focus lens by using the straight distance.

Further, the first rotation angle may be a pitch angle, the second rotation angle may be a roll angle, and the third rotation angle may be a yaw angle.

Meanwhile, a method for controlling an electronic apparatus performing keystone correction by using an acceleration sensor and a plurality of distance sensors arranged on one surface of the electronic apparatus facing a projection surface according to an embodiment of the disclosure includes the operations of calculating a first rotation angle and a second rotation angle for the direction of gravity of the electronic apparatus by using the acceleration sensor, calculating a third rotation angle of the electronic apparatus for the projection surface by using the plurality of distance sensors, and performing keystone correction based on the first to third rotation angles, wherein the plurality of distance sensors are arranged side by side on left and right sides on the one surface, and are arranged to be rotated by a first angle to face one another. Also, in the operation of calculating a third rotation angle, a third rotation angle of the electronic apparatus for the projection surface may be calculated based on the sensing values acquired by using the plurality of distance sensors and the first angle.

In addition, the controlling method includes the operation of determining a movement of the electronic apparatus by using sensing values acquired through the acceleration sensor and the plurality of distance sensors, and based on determining that the electronic apparatus is in a stopped state, the electronic apparatus may calculate the first to third rotation angles by using the acceleration sensor and the plurality of distance sensors.

Further, the first angle may be an angle by which the plurality of distance sensors were rotated such that lights output by the plurality of distance sensors are located within the projection surface, and may be an angle by which the plurality of distance sensors were rotated such that lights output by the plurality of distance sensors intersect one another before reaching the projection surface.

Also, the plurality of distance sensors may be arranged to be rotated by a second angle in an upper direction or a lower direction to be toward the center of the projection surface.

In addition, the controlling method may include the operations of calculating a first distance between the center of the plurality of distance sensors and the center of the projection surface by using the sensing values acquired through the plurality of distance sensors, and calculating a straight distance from the center of the plurality of distance sensors to the projection surface by using the first distance and the second angle.

Further, the controlling method may include the operation of performing auto-focusing by moving a predetermined location of a focus lens by using the straight distance.

Also, the first rotation angle may be a pitch angle, the second rotation angle may be a roll angle, and the third rotation angle may be a yaw angle.

According to the disclosure as described above, a rotation angle of an electronic apparatus can be measured precisely even in a narrow space by using an acceleration sensor and a plurality of distance sensors arranged to be rotated, without using a separate image sensor. By this, the electronic apparatus can perform more precise keystone correction.

BRIEF DESCRIPTION OF THE DRAWINGS

FIG. 6 to FIG. 10 are diagrams for illustrating a method of performing keystone correction according to an embodiment of the disclosure;

DETAILED DESCRIPTION

Figure 1:
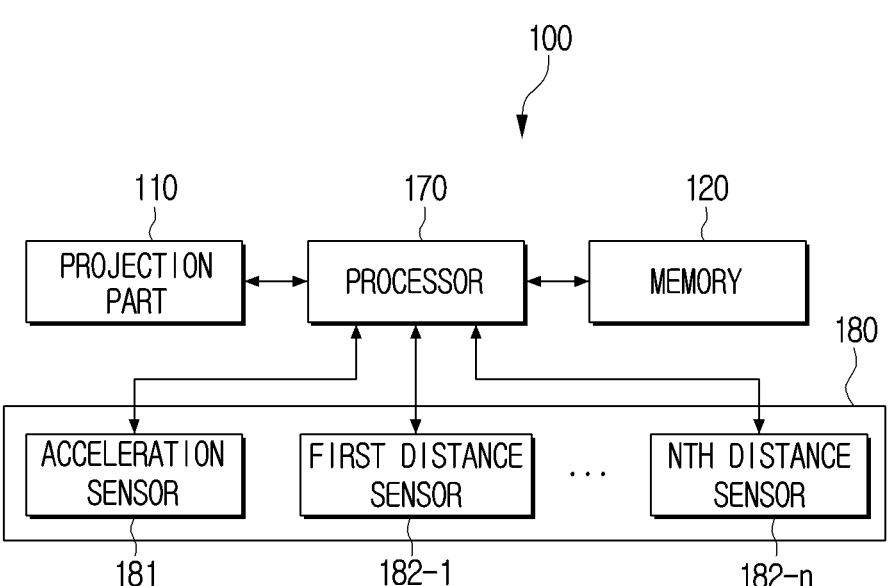
FIG. 1 is a block diagram illustrating a configuration of an electronic apparatus according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In addition, in describing the disclosure, in case it is determined that detailed explanation of related known functions or features may unnecessarily confuse the gist of the disclosure, the detailed explanation will be omitted.

Further, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Also, the terms used in the disclosure are used only to explain specific embodiments, and are not intended to limit the scope of the disclosure. Further, singular expressions include plural expressions, unless defined obviously differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Also, the expressions "first," "second," and the like used in the disclosure may describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, 'a module' or 'a part' may perform at least one function or operation, and may be implemented as hardware or software, or as a combination of hardware and software. Also, a plurality of 'modules' or 'parts' may be integrated into at least one module and implemented as at least one processor, excluding 'a module' or 'a part' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, various embodiments of the disclosure will be described in detail with reference to the accompanying drawings. FIG. 1 is a block diagram illustrating a configuration of an electronic apparatus according to an embodiment of the disclosure. In an embodiment of the disclosure, the electronic apparatus 100 may be implemented as a projector projecting an image on a wall or a screen, or a display apparatus equipped with an image projection function, etc., and thus it will be described by being generally referred to as the electronic apparatus 100 in this specification.

As illustrated in FIG. 1, the electronic apparatus 100 may include a projection part 110, a memory 120, a processor 170, and a sensor part 180.

The projection part 110 is a component for projecting a light for expressing an image to the outside. The projection part 110 may include various detailed components such as a light source, a projection lens, a reflector, etc. An operation method and the detailed components of the projection part 110 will be described in detail again in the parts that will be described below.

The sensor part 180 is a component for acquiring state information of the electronic apparatus 100, or information on the surrounding environment of the electronic apparatus 100. In particular, the sensor part 180 may include an acceleration sensor 181 for detecting a posture of the electronic apparatus 100 and a plurality of distance sensors 182-1-182-n.

The acceleration sensor 181 is a component for detecting an angle by which the electronic apparatus 100 was rotated in the direction of gravity. As the acceleration sensor 181 according to an embodiment of the disclosure, a three-axis acceleration sensor or a two-axis acceleration sensor may be used. A three-axis acceleration sensor measures acceleration of gravity for each axis, and provides sensing values to the processor 170. The processor 170 may calculate a first rotation angle (e.g., a pitch angle) and a second rotation angle (e.g., a roll angle) for the direction of gravity of the electronic apparatus 100 based on sensing values acquired through the acceleration sensor 181. The acceleration sensor 181 may be provided inside the electronic apparatus 100, as illustrated in FIG. 2A.

The plurality of distance sensors 182-1-182-n are components for detecting a distance with an external object. In particular, the plurality of distance sensors 182-1-182-n according to an embodiment of the disclosure are components for acquiring information on a distance to the projection surface. The processor 170 may calculate a third rotation angle (e.g., a yaw angle) of the electronic apparatus 100 for the projection surface based on sensing values acquired through the plurality of distance sensors 182-1-182-n. Here, the distance sensors may be implemented in various types such as an infrared sensor, a LiDAR sensor, a radar sensor, a photo diode sensor, a depth sensor, an ultrasonic sensor, etc.

Figure 2A:
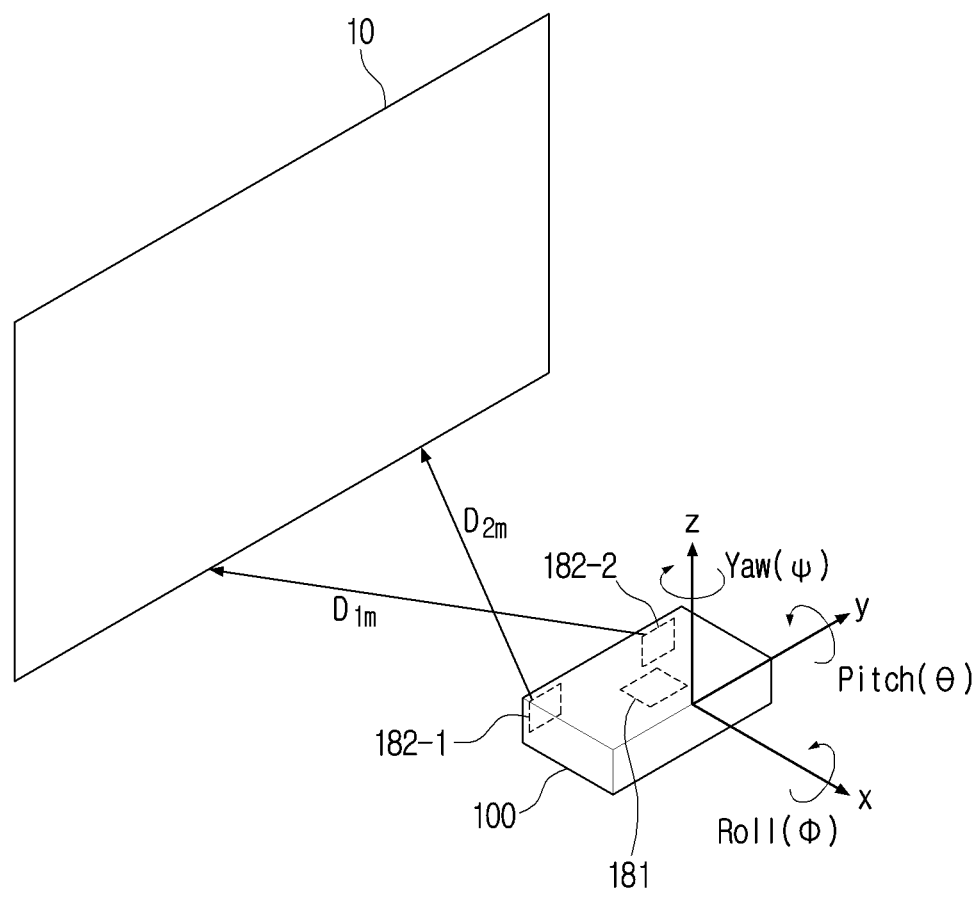
FIG. 2A and FIG. 2B are diagrams for illustrating a plurality of distance sensors included in an electronic apparatus according to an embodiment of the disclosure.
Figure 2B:
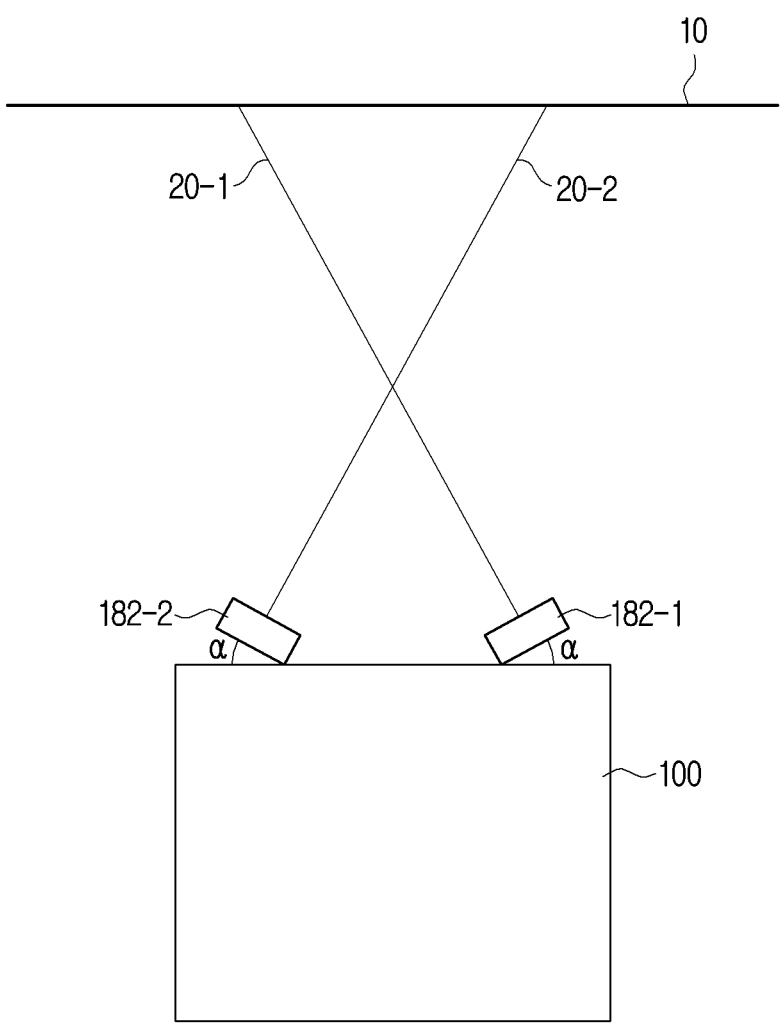

FIG. 2A and FIG. 2B are diagrams for illustrating an arrangement location and a rotation angle of the sensor 100 according to an embodiment of the disclosure. As illustrated in FIG. 2A, if x, y, and z axes are defined based on the electronic apparatus 100, a pitch angle ($\theta$) rotating based on the y axis, a roll angle ($\phi$) rotating based on the x axis, and a yaw angle ($\Psi$) rotating based on the z axis are respectively defined. As the distance sensors according to an embodiment of the disclosure, two distance sensors may be included, and the two distance sensors 182-1, 182-2 may be located on the front surface (i.e., the surface facing the projection surface 10) of the electronic apparatus 100, and may be arranged side by side in left and right directions, as illustrated in FIG. 2A. Meanwhile, the case wherein there are two distance sensors is merely an example, and a plurality of distance sensors (e.g., four, six, etc.) may be included.

Also, the two distance sensors 182-1, 182-2 may be arranged to be rotated as much as a first angle α to face each other, as illustrated in FIG. 2B. That is, the two distance sensors 182-1, 182-2 may be arranged to be symmetrically rotated as much as the first angle α to face each other based on the z axis.

Here, the first angle α may be an angle by which the two distance sensors 182-1, 182-2 were rotated such that lights 20-1, 20-2 output by the two distance sensors 182-1, 182-2 are located within the projection surface 10. Also, the first angle α may be an angle by which the two distance sensors 182-1, 182-2 were rotated such that the lights 20-1, 20-2 output by the two distance sensors 182-1, 182-2 intersect one another before reaching the projection surface 10.

Figure 3:
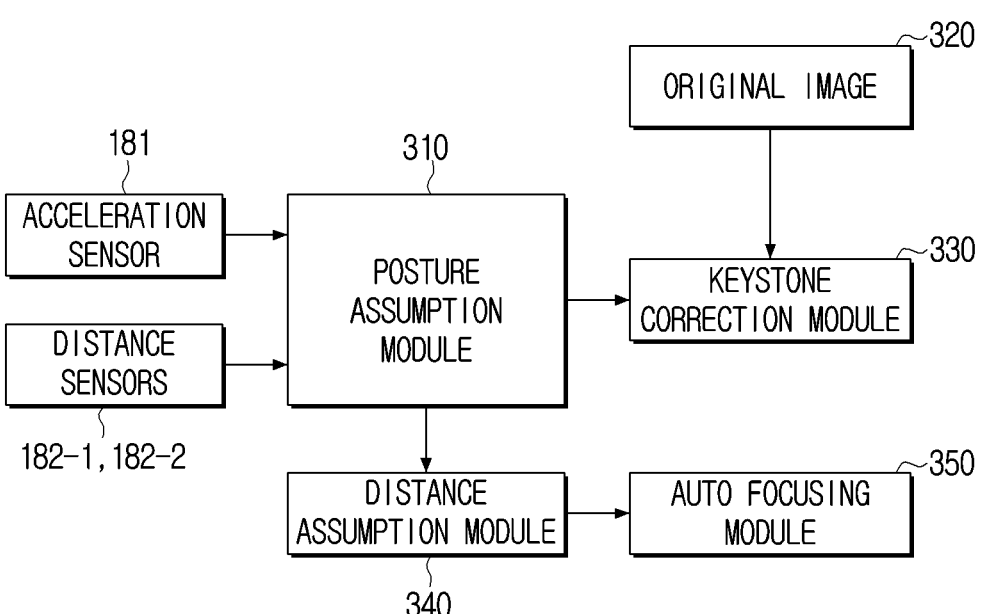
FIG. 3 is a diagram for illustrating components for performing keystone correction and auto focusing according to an embodiment of the disclosure.

The memory 120 may store at least one instruction for controlling the electronic apparatus 100. In particular, the memory 120 may store data necessary for a module for performing keystone correction and auto focusing to perform various kinds of operations. The module for performing keystone correction and auto focusing may include a posture assumption module 310, a keystone correction module 330, a distance assumption module 340, and an auto focusing module 350 as illustrated in FIG. 3.

Meanwhile, the memory 120 may include a non-volatile memory that can maintain the stored information even if power supply is stopped, and a volatile memory that needs constant power supply to maintain the stored information. The module for performing keystone correction and auto-focusing may be stored in the non-volatile memory.

The processor 170 may be electronically connected with the memory 120, and control the overall functions and operations of the electronic apparatus 100.

If an event for performing a keystone correction operation or an auto-focusing operation is detected, the processor 170 may load data for the module for performing keystone correction or auto-focusing stored in the non-volatile memory to perform various kinds of operations on the volatile memory. The processor 170 may perform various kinds of operations by using various kinds of modules based on the data loaded on the volatile memory. Here, loading means an operation of calling data stored in the non-volatile memory into the volatile memory and storing the data, such that the processor 170 can access the data.

In particular, the processor 170 may calculate a first rotation angle and a second rotation angle for the direction of gravity of the electronic apparatus 100 based on the sensing values acquired by using the acceleration sensor 181, and calculate a third rotation angle of the electronic apparatus 100 for the projection surface 10 based on the sensing values acquired by using the plurality of distance sensors 182-1-182-n and the first angle by which the plurality of distance sensors 182-1-182-n were rotated. Then, the processor 170 may perform keystone correction based on the first to third rotation angles. Also, the processor 170 may acquire a straight distance to the projection surface 10 based on the sensing values acquired through the plurality of distance sensors 182-1-182-n, and perform auto focusing based on the acquired straight distance.

Keystone correction and auto focusing will be described in more detail with reference to FIG. 3 to FIG. 10.

The acceleration sensor 181 and the distance sensors 182-1, 182-2 may acquire sensing values. Then, the acceleration sensor 181 and the distance sensors 182-1, 182-2 may output the acquired sensing values to the posture assumption module 310.

The posture assumption module 310 may determine a movement of the electronic apparatus by using the sensing values acquired through the acceleration sensor 181 and the distance sensors 182-1, 182-2. Specifically, the posture assumption module 310 may collect the sensing values prior to an n sample to the current sensing values acquired through the acceleration sensor 181 and the distance sensors 182-1, 182-2, and determine whether there is a movement of the electronic apparatus 100 by using the average, the variance, the standard deviation, etc. of the collected sensing values. Here, the posture assumption module 310 may additionally perform a filtering operation (a low-pass filter, a moving average) for removing noises from the sensing values acquired through the acceleration sensor 181 and the distance sensors 182-1, 182-2.

Then, if it is determined that the electronic apparatus 100 is in a stopped state (i.e., a state wherein there is no movement), the posture assumption module 310 may calculate the first to third rotation angles by using the acceleration sensor 181 and the distance sensors 182-1, 182-2.

Specifically, the posture assumption module 310 calculates a pitch angle and a roll angle based on the sensing values output from the acceleration sensor 181, i.e., the detection result. If there is no movement of the electronic apparatus 100 including the acceleration sensor 181, only influence by the acceleration of gravity is measured at each axis of the acceleration sensor 181, and if the sensing value acquired when there was no movement of the electronic apparatus 100 is used, it can be figured out how much the apparatus including the acceleration sensor 181 is tilted with respect to the direction of gravity. Specifically, a roll angle (φ) and a pitch angle (θ) can be calculated by Formula 1 and Formula 2 as below.

$$\phi = \tan^{-1}\left(\frac{A_{by}}{A_{bz}}\right) \qquad \text{[Formula 1]}$$

$$\theta = \tan^{-1}\left(\frac{A_{bx}}{\sqrt{A_{by}^2 + A_{bz}^2}}\right) \qquad \text{[Formula 2]}$$

In Formula 1, Abx, Aby, and Abz are respectively the acceleration values of the x, y, and z axes of the acceleration sensor 181.

Figure 4:
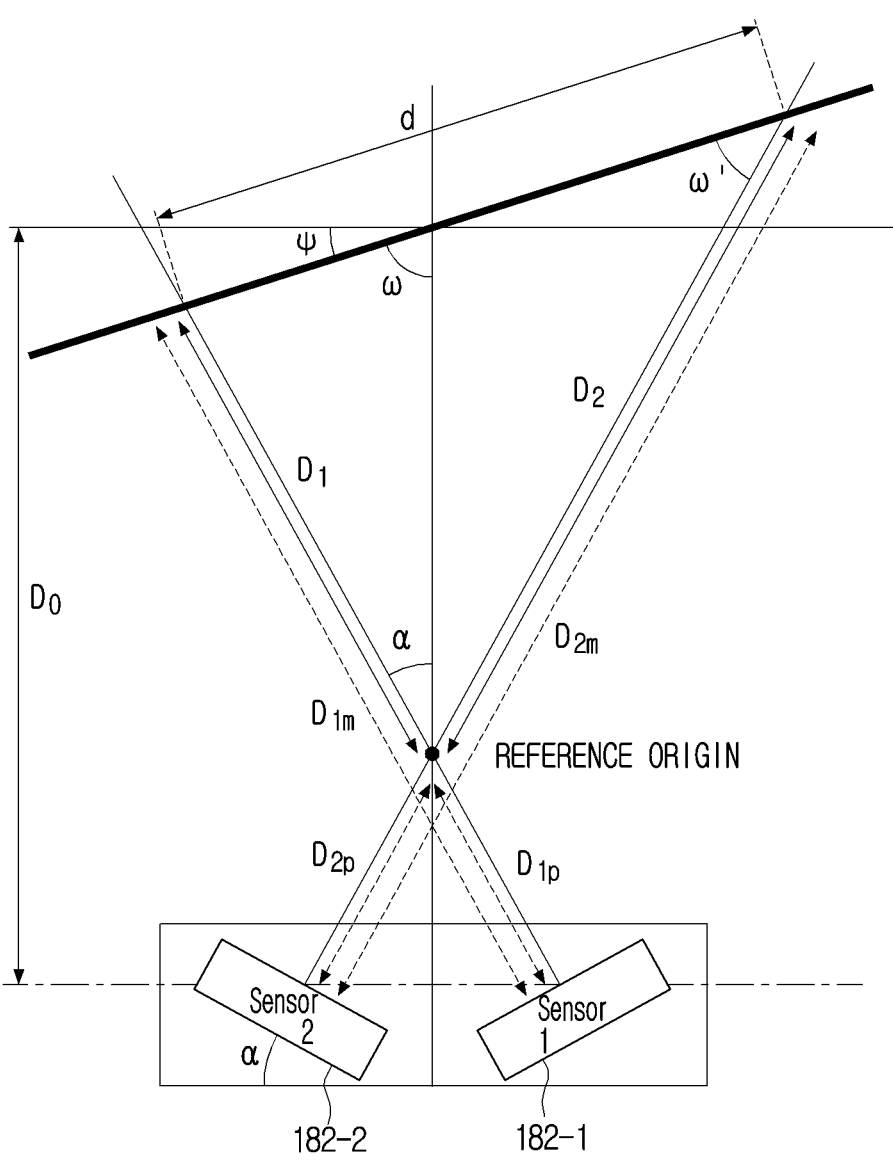
FIG. 4 is a diagram for illustrating a method of calculating a rotation angle of an electronic apparatus for a projection surface according to an embodiment of the disclosure.

Also, the posture assumption module 310 may calculate a yaw angle based on the sensing values output from the distance sensors 182-1, 182-2. Specifically, as illustrated in FIG. 4, the posture assumption module 310 may calculate a first distance value (D1m) by a first sensing value acquired from the first distance sensor 182-1, and calculate a second distance value (D2m) by a second sensing value acquired from the second distance sensor 182-2. Meanwhile, the distance (D1p) from the first distance sensor 182-1 to the reference origin, the distance (D2p) from the second distance sensor 182-2 to the reference origin, and the angle (α) by which the two distance sensors 182-1, 182-2 were rotated may be stored in advance. Here, the reference origin may be an intersecting point of a light output by the first distance sensor 182-1 and a light output by the second distance sensor 182-2.

The posture assumption module 310 may calculate a yaw angle (ψ) through Formula 3 to Formula 6 as below.

$$d^2 = D_1^2 + D_2^2 - 2D_1D_2\cos(2\alpha). \qquad \text{[Formula 3]}$$

Here, D1 may be a distance which is a result of subtracting D1p from D1m, and D2 may be a distance which is a result of subtracting D2p from D2m.

$$\cos(\omega') = \frac{D_2 - D_1\cos(2\alpha)^2}{d} \qquad \text{[Formula 4]}$$

Here, d may be a distance between a reaching point, when a light output by the distance sensors 182-1, 182-2 reaches the projection surface 10. Also, $\omega'$ may be an angle between the projection surface 10 and a light output from the second distance sensor 182-2.

$$\omega = \omega' + \alpha \qquad \text{[Formula 5]}$$

Here, $\omega$ may be an angle between the projection surface 10 and a line connecting the center of the projection surface 10 and the center of the electronic apparatus 100.

$$\psi = 90 - \omega \qquad \text{[Formula 6]}$$

Meanwhile, FIG. 2A and FIG. 2B illustrate a case wherein the two distance sensors 182-1, 182-2 are arranged in the front surface direction of the electronic apparatus 100. However, the arrangement locations of the distance sensors may vary according to the exterior or the arrangement location of the electronic apparatus 100. As in FIG. 5, in case the electronic apparatus 100 is arranged on the bottom surface, and the projection surface 10 is installed in the upper direction on the front side of the electronic apparatus 100, the distance sensors 182-1, 182-2 may be arranged to be rotated as much as a second angle β in the upper direction to be toward the center of the projection surface. Meanwhile, as illustrated in FIG. 5, the case wherein the electronic apparatus 100 is arranged on the bottom surface is merely an example, and in case the electronic apparatus 100 is arranged on the ceiling, and the projection surface 10 is installed in the lower direction on the front side of the electronic apparatus 100, the distance sensors 182-1, 182-2 may be arranged to be rotated as much as the second angle β in the lower or upper direction to be toward the center of the projection surface.

Figure 5:
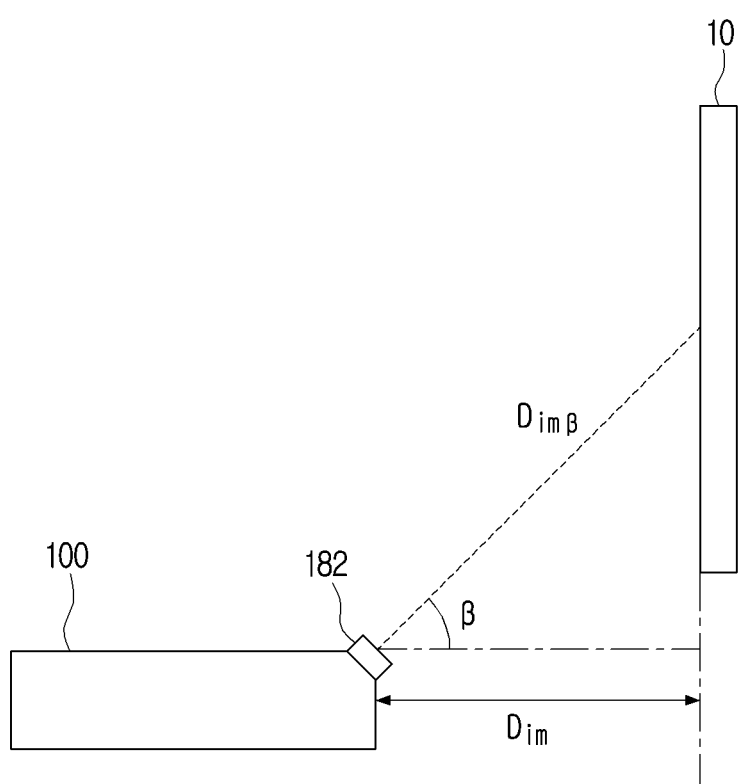
FIG. 5 is a diagram for illustrating a method of calculating a straight distance between an electronic apparatus and a projection surface according to an embodiment of the disclosure.

In this case, as illustrated in FIG. 5, the posture assumption apparatus 100 may convert the distance values (D1mβ, D2mβ) acquired from the distance sensors 182-1, 182-2 into a straight distance based on the x axis, and calculate a yaw angle ($\psi$). That is, the formula for acquiring the straight distance (Dim) between the projection surface 10 and the distance sensors from the distance values (D1mβ, D2mβ) acquired from the distance sensors 182-1, 182-2 is as Formula 7 below.

$$D_{im} = D_{im\beta}\cos(\beta) \qquad \text{[Formula 7]}$$

Here, i may be the number of the distance sensor.

Then, the posture assumption apparatus 100 may calculate the yaw angle ($\psi$) based on the straight distance (Dim) calculated by Formula 7, and Formulae 3 to 6.

The keystone correction module 330 may perform keystone correction for the original image 320 by using the first to third rotation angles (i.e., the pitch angle ($\theta$), the roll angle ($\varphi$), the yaw angle ($\psi$)) acquired through the posture assumption module 310.

A method for the keystone correction module 330 to perform keystone correction will be described in more detail with reference to FIG. 6 to FIG. 10.

FIG. 5 is a diagram for illustrating a method of keystone correction. As illustrated in FIG. 2A, if the pitch angle ($\theta$), the roll angle ($\varphi$), and the yaw angle ($\psi$) have been defined, when the tilt of the electronic apparatus 100 is in a normal state, if the processor 170 controls the projection part 110 and projects an image, an image wherein there is no keystone phenomenon is displayed on the projection surface 10. In the disclosure, a normal state means a case wherein a rotation angle between the electronic apparatus 100 and the projection surface 10, an angle by which the electronic apparatus 100 is tilted, etc. are respectively reference values. In a general case, the reference value may be 0, but depending on the placed location or the state of the surroundings, a value which is not 0 may be set as the reference value.

In case the electronic apparatus 100 is tilted in the x axis direction and the roll angle became different from the reference value (e.g., 0), according to the tilted direction, an image projected on the projection surface 10 is displayed while being tilted to the right side (31), or being tilted to the left side (32). The keystone correction module 330 rotates the image in an opposite direction to the changed direction of the roll angle, and makes the image in a normal form (30) displayed on the projection surface 10.

In case the electronic apparatus 100 is tilted in the y axis direction and the pitch angle became different from the reference value (e.g., 0), according to the tilted direction, an image projected on the projection surface 10 becomes a trapezoid shape (41, 42). In this case, the keystone correction module 330 performs correction of increasing the length of the upper side, or increasing the length of the lower side, and makes the image in a normal form (40) displayed on the projection surface 10.

In case the electronic apparatus 100 is tilted in the z axis direction and the yaw angle became different from the reference value (e.g., 0), according to the tilted direction, an image projected on the projection surface 10 becomes a trapezoid shape of which left side or right side is short (51, 52). In this case, the keystone correction module 330 performs correction of increasing the length of the left side, or increasing the length of the right side of the image, and makes the image in a normal form (50) displayed on the projection surface 10.

Figure 7:
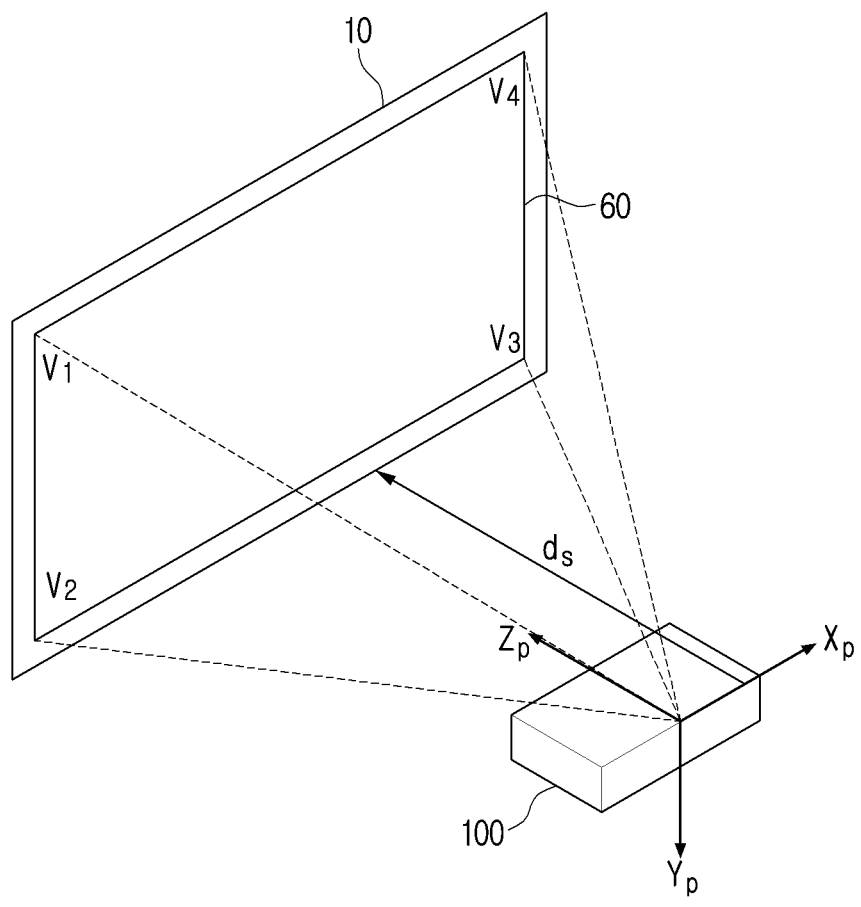

FIG. 7 is a diagram for illustrating in more detail a method of performing keystone correction. The electronic apparatus 100 may acquire information necessary for keystone correction through an initial setting operation, and store it in advance.

Specifically, in a state wherein the projection surface 10 and the electronic apparatus 100 are arranged as in FIG. 7, if an image of a predetermined resolution is output to the electronic apparatus 100 while the rotation angle between the electronic apparatus 100 and the projection surface 10 is 0, and all of the tilt angles in the direction of gravity are 0 (i.e., all of the roll angle, the pitch angle, and the yaw angle are 0), an image wherein there is no keystone phenomenon is displayed on the projection surface 10. Here, the electronic apparatus 100 measures in advance the distance ds between the center of the projection lens of the projection part 110 and the projection surface 10, and the three-dimensional coordinates [vkx, vky, vkz]T of the four vertexes (v1, v2, v3, v4) of the quadrangle image 60 projected on the projection surface 10 centered around the projection lens, and stores them. As the wide angle of the lens of the electronic apparatus 100 projecting a light is restrictive, a size of an image that can be displayed at the maximum varies according to the distance to the projection surface 10. In an initial setting operation, a user may set the distance such that an image can be displayed as big as possible within the projection surface 10. In a state wherein the distance was adjusted as above, if the setting menu (not shown), etc. are pushed, the distance information sensed at this time point and the coordinate information of the four vertexes of the image displayed at this time point, etc. are stored. In the disclosure, when an image wherein there is no keystone phenomenon is displayed on the projection surface 10, a range within the coordinates of the four vertexes is referred to as an image display range.

Regarding a method of measuring the distance ds to the projection surface 10, the distance may be measured by various methods according to the number and the locations of the distance sensors. The processor 170 may calculate the three-dimensional coordinates of the four vertexes projected on the projection surface 10, based on the size of the image to be projected and the distance ds. Here, k is the number of each vertex. Even if the distance ds changes after the setting, and the three-dimensional coordinates of the four vertexes of the quadrangle image 60 change in accordance thereto, they may be acquired newly through measurement and calculation. As the standard of the three-dimensional coordinates for expressing the four vertexes on the projection surface 10, the coordinate system (Xp, Yp, Zp) centered around the projection lens of the electronic apparatus 100 becomes the standard, as illustrated in FIG. 7.

Meanwhile, as described above, the electronic apparatus 100 may be tilted or placed obliquely based on the projection surface 10 according to the arrangement state, and due to this, at least one of the pitch angle, the roll angle, or the yaw angle may not be 0. The posture assumption module 310 acquires a rotation matrix R as below by using the pitch angle, the roll angle, and the yaw angle calculated by using Formulae 1 to 7.

$$R = R_{x,\phi}R_{y,\theta}R_{z,\psi}$$ [Formula 8]

$$R_{x,\phi} = \begin{bmatrix} 1 & 0 & 0 \\ 0 & \cos(\phi) & \sin(\phi) \\ 0 & -\sin(\phi) & \cos(\phi) \end{bmatrix}$$

$$R_{y,\theta} = \begin{bmatrix} \cos(\theta) & 0 & -\sin(\theta) \\ 0 & 1 & 0 \\ \sin(\theta) & 0 & \cos(\theta) \end{bmatrix}$$

$$R_{z,\psi} = \begin{bmatrix} \cos(\psi) & \sin(\psi) & 0 \\ -\sin(\psi) & \cos(\psi) & 0 \\ 0 & 0 & 1 \end{bmatrix}$$

The keystone correction module 330 may calculate the distance ds between the center of the projection lens and the projection surface 10 measured while all of the rotation angles (the pitch angle, the roll angle, the yaw angle) are 0 through conversion using the rotation matrix R.

When the pitch angle, the roll angle, and the yaw angle calculated based on Formulae 1 to 7, the aforementioned distance ds between the center of the lens and the projection surface 10, and the three-dimensional coordinates of the four vertexes of the quadrangle image before rotation are acquired, the keystone correction module 330 may calculate the coordinates of the four vertexes when keystone occurred by using Formula 9 below.

$$p_k = \begin{bmatrix} p_{kx} \\ p_{ky} \\ p_{kz} \end{bmatrix} = \begin{bmatrix} \dfrac{x_k}{(z_k/d_s)} \\ \dfrac{y_k}{(z_k/d_s)} \\ d_s \end{bmatrix}$$ [Formula 9]

In Formula 9, pk means the three-dimensional coordinates of the kth vertex [pkx, pky, pkz]T when keystone occurred. In Formula 5, xk, yk, zk can be calculated by using Formula 10 below.

$$\begin{bmatrix} x_k \\ y_k \\ z_k \end{bmatrix} = R_p v_k = R_p \begin{bmatrix} v_{kx} \\ v_{ky} \\ v_{kz} \end{bmatrix}$$ [Formula 10]

In Formula 10, k means the number of each vertex, and the three-dimensional coordinates [xk, yk, zk]T are coordinates after the three-dimensional coordinates of the kth vertex [pkx, pky, pkz]T were rotated with the rotation matrix Rp. Referring to FIG. 7 and Formulae 9 and 10, the distance for the Zp coordinate axis of the four vertexes is always ds, and thus it can be figured out that pkz=ds.

The rotation matrix Rp used in Formula 10 can be defined as in Formula 11 below.

$$R_p = R_{X,\theta}R_{Y,\psi}R_{Z,\phi}$$ [Formula 11]

$$R_{X,\theta} = \begin{bmatrix} 1 & 0 & 0 \\ 0 & \cos(\theta) & \sin(\theta) \\ 0 & -\sin(\theta) & \cos(\theta) \end{bmatrix}$$

$$R_{Y,\psi} = \begin{bmatrix} \cos(-\psi) & 0 & -\sin(-\psi) \\ 0 & 1 & 0 \\ \sin(-\psi) & 0 & \cos(-\psi) \end{bmatrix}$$

$$R_{Z,\phi} = \begin{bmatrix} \cos(-\phi) & \sin(-\phi) & 0 \\ -\sin(-\phi) & \cos(-\phi) & 0 \\ 0 & 0 & 1 \end{bmatrix}$$

In a state as above, the relation between the pixel location coordinates of the kth vertex [μkx, μky, 1]T among the four vertexes (μ1, μ2, μ3, μ4) of the image to be projected on the projection surface 10, and the locations of the four vertexes (p1, p2, p3, p4) on the projection surface 10 assumed when keystone occurred is defined as in Formula 12 below.

$$p_k = P\mu_k = P \begin{bmatrix} \mu_{kx} \\ \mu_{ky} \\ 1 \end{bmatrix}$$ [Formula 12]

In Formula 12, P means a projection matrix. The projection matrix P may be modeled with homography, and its form can be expressed as in Formula 13 below.

$$P = \begin{bmatrix} a & b & c \\ d & e & f \\ g & h & 1 \end{bmatrix}$$ [Formula 13]

Here, parameters a, b, c, d, e, f, g, and h can be acquired by substituting the pixel locations of the four vertexes (μ1, μ2, μ3, μ4) of the image to be projected on the projection surface 10, and the pixel locations of the four vertexes (p1, p2, p3, p4) on the projection surface 10 assumed when keystone occurred in Formula 13.

Ultimately, the keystone correction module 330 may perform keystone correction by converting the locations of each pixel (xp, yp) of the original image 320 by using Formula 14 below.

$$\begin{bmatrix} x_w \\ y_w \\ 1 \end{bmatrix} = W \begin{bmatrix} x_p \\ y_p \\ 1 \end{bmatrix} = P^{-1}S \begin{bmatrix} x_p \\ y_p \\ 1 \end{bmatrix} \qquad \text{[Formula 14]}$$

In Formula 14, P−1 is an inverse matrix of the projection matrix. Also, S means a matrix consisting of a scale parameter s for the change of the size, and parameters tx and ty for movement of locations to the x axis direction and the y axis direction. Specifically, S can be expressed as in Formula 15 below.

$$S = \begin{bmatrix} s & 0 & t_x \\ 0 & s & t_y \\ 0 & 0 & 1 \end{bmatrix} \qquad \text{[Formula 15]}$$

The keystone correction module 330 sets the scale parameter s such that a rectangle is formed, of which vertexes are located inside the image wherein keystone occurred, and the resolution of the image of the original image becomes as big as possible. Also, if a user manipulation for moving the display location of the image is input, or a situation that the display location should be moved occurs, the keystone correction module 330 may adjust at least one of tx or ty.

Specifically, the keystone correction module 330 calculates the four vertexes of the image projected on the projection surface 10. If the calculated coordinates of the vertexes are beyond the coordinates of the four vertexes of the projection surface 10, the keystone correction module 330 adjusts the scale parameter s to be smaller, and makes the image for which keystone correction was performed not go beyond the projection surface 10. The keystone correction module 330 sets the scale parameter s such that the image for which keystone correction was performed can be displayed at the maximum within the range of not going beyond the projection surface 10. In the case of an electronic apparatus 100 having an optical zoom function, the keystone correction module 330 may acquire the coordinates of the four vertexes of the image for which keystone correction was performed that is projected on the projection surface 10 by using information on the distance and the magnification of the zoom. In this case, the keystone correction module 330 may adjust the magnification of the zoom such that the four vertexes are optimized for the projection surface 10.

Figure 8:
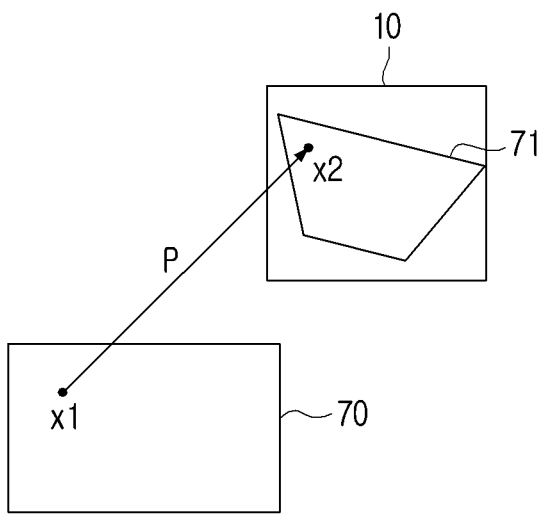
Figure 9:
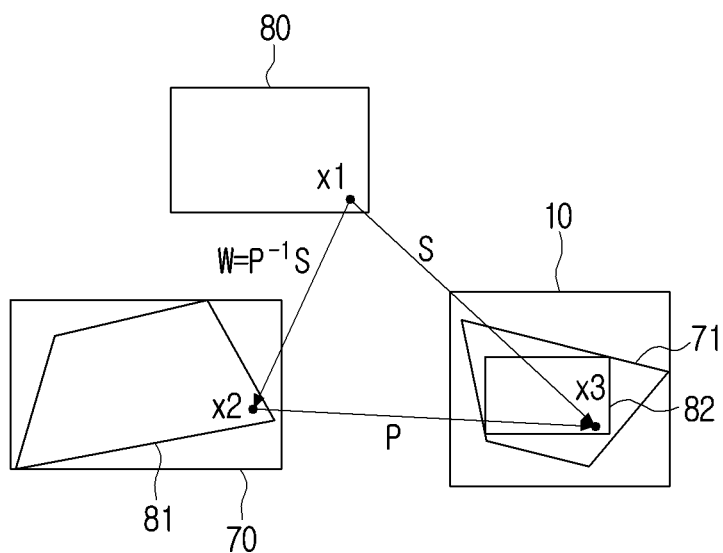

FIG. 8 and FIG. 9 are diagrams for illustrating an effect according to keystone correction. Referring to FIG. 8, it can be figured out that, if an image frame 70 in a rectangular shape is projected from the electronic apparatus 100, an image frame 71 warped by a keystone effect is displayed on the projection surface 10. For example, the image may be distorted in having a trapezoidal shape, instead of a rectangular shape. Here, the image frame 70 is included in a light projected from the projection part 110. The pixel x1 within the image frame 70 is displayed in the location x2 on the projection surface 10 that is determined by the projection matrix.

The keystone correction module 330 converts the original image 80 into a corrected image 81 as illustrated in FIG. 9, for correcting the keystone effect. The keystone correction module 330 controls the projection part 110 to project the image frame 70 including the corrected image 81. Accordingly, even if a keystone effect occurs in the projection surface 10 and the image frame 70 is warped, the image 82 displayed on the projection surface 10 becomes a rectangular shape. Also, it can be figured out that the location of one pixel x1 within the original image 80 is located on the x2 point within the corrected image 81 by the projection matrix P and the scaling matrix S, and is located on the x3 point in the image 82 displayed on the projection surface 10.

As described above, the keystone correction module 330 compares the coordinates of the four vertexes of the image to be displayed on the projection surface 10, and the coordinates of the four vertexes of the image displayed on the projection surface 10 in a normal state (i.e., a state wherein all of the pitch angle, the roll angle, and the yaw angle are 0 or fixed to a reference value) at the same distance, and identify whether the image to be actually displayed is within a predetermined area of the projection surface 10. If the image projected on the projection surface 10 exceeds the predetermined area within the projection surface 10, the keystone correction module 330 may control the size of the image for which keystone correction was performed, and project the image within the predetermined area. For example, the predetermined area may be an area within the range of the size of the projection surface 10.

If the projected image is located within the predetermined area, the keystone correction module 330 sets the scale parameter such that the image becomes maximum within the range. In this case, if there is a user manipulation, the keystone correction module 330 may adjust the scale parameter and reduce the size of the image.

Information on the distance measured in a normal state, the coordinates of the four vertexes of the image displayed on the projection surface 10, etc. may be stored in a memory (not shown) provided in the electronic apparatus 100, or it may be provided from a separate source. Alternatively, the information may be directly input by a user.

Also, if the actual size information of the projection surface 10 or coordinate information of each vertex of the projection surface 10 is stored in advance, the keystone correction module 330 may compare the information with the stored information, and adjust the size of the image for which keystone correction was performed.

In this embodiment, a keystone correction operation and an adjustment operation of a size of an image may be processed at once through one calculating operation, or they may be processed sequentially depending on implementation methods. As an example, an adjustment operation of a size of an image may be additionally performed according to a user's selection, after keystone correction is performed.

Figure 10:
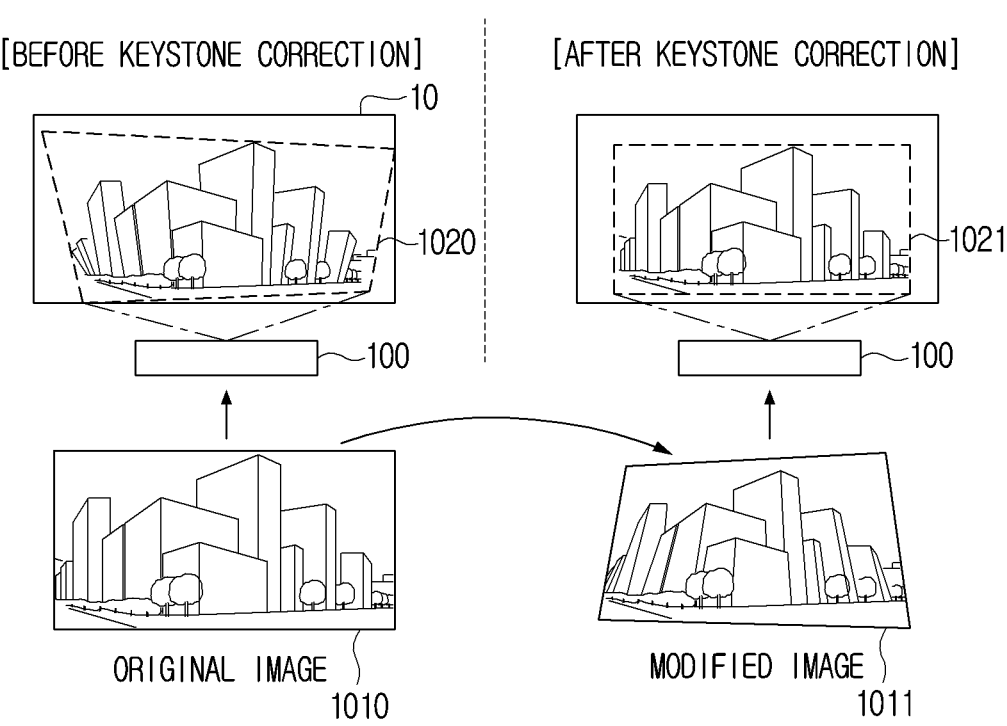

FIG. 10 is a diagram for illustrating an effect of keystone correction by the electronic apparatus 100 according to an embodiment of the disclosure. According to FIG. 10, in case an original image 1010 is output as it is, a warped image 1020 is displayed on the projection surface 10. The electronic apparatus 100 modifies the original image before projection and generates a corrected image 1011, and outputs the image. Accordingly, on the projection surface 10, an unwarped image 1021 is displayed. The size of the unwarped image 1021 is displayed at the maximum within a range that can be actually expressed, and in case the size is beyond the size of the projection surface 10, the image is displayed in a reduced size to suit the size of the projection surface 10. As a result, the user can view an image in a normal state of a maximum size and a maximum resolution that are possible in the current state, without a separate manipulation.

Explaining regarding FIG. 3 again, the distance assumption module 340 may assume the distance between the electronic apparatus 100 and the projection surface by using sensing values acquired from the distance sensors 182-1, 182-2.

Specifically, the distance assumption module 340 may calculate a first distance D0 between the center of the distance sensors 182-1, 182-2 and the center of the projection surface 10 by using sensing values acquired through the distance sensors 182-1, 182-2.

Specifically, the distance assumption module 340 may calculate the first distance D0 between the center of the distance sensors 182-1, 182-2 and the center of the projection surface 10 by using Formula 16 below.

$$D_0 = D_{1m}\cos(\alpha) + D_2 \frac{\sin(\alpha)}{\tan(\omega)} \qquad \text{[Formula 16]}$$

Here, D1m may be the first distance value by the first sensing value acquired from the first distance sensor 182-1, as described above, and D2 may be the distance which is a result of subtracting D2p from D2m, and ω may be an angle between the projection surface 10 and a line connecting the center of the projection surface 10 and the center of the electronic apparatus 100.

Meanwhile, as in FIG. 5, in case the electronic apparatus 100 is arranged on the bottom surface, and the projection surface 10 is installed in the upper direction on the front side of the electronic apparatus 100, the distance sensors 182-1, 182-2 may be arranged to be rotated as much as a second angle β in the upper direction to be toward the center of the projection surface. Here, the distance assumption module 340 may calculate a straight distance from the center of the distance sensors 182-1, 182-2 to the projection surface 10 by using the first distance D0 and the second angle β.

That is, the distance assumption module 340 may multiply cos (β) to D0 calculated by Formula 17, and calculate a straight distance from the center of the distance sensors 182-1, 182-2 to the projection surface 10.

The auto focusing module 350 may perform auto focusing by using the straight distance from the center of the distance sensors 182-1, 182-2 to the projection surface 10. Specifically, the auto focusing module 350 may move the predetermined location of a focus lens according to the straight distance from the center of the distance sensors 182-1, 182-2 to the projection surface 10, and adjust the focus of the projection part 110 automatically.

Figure 11:
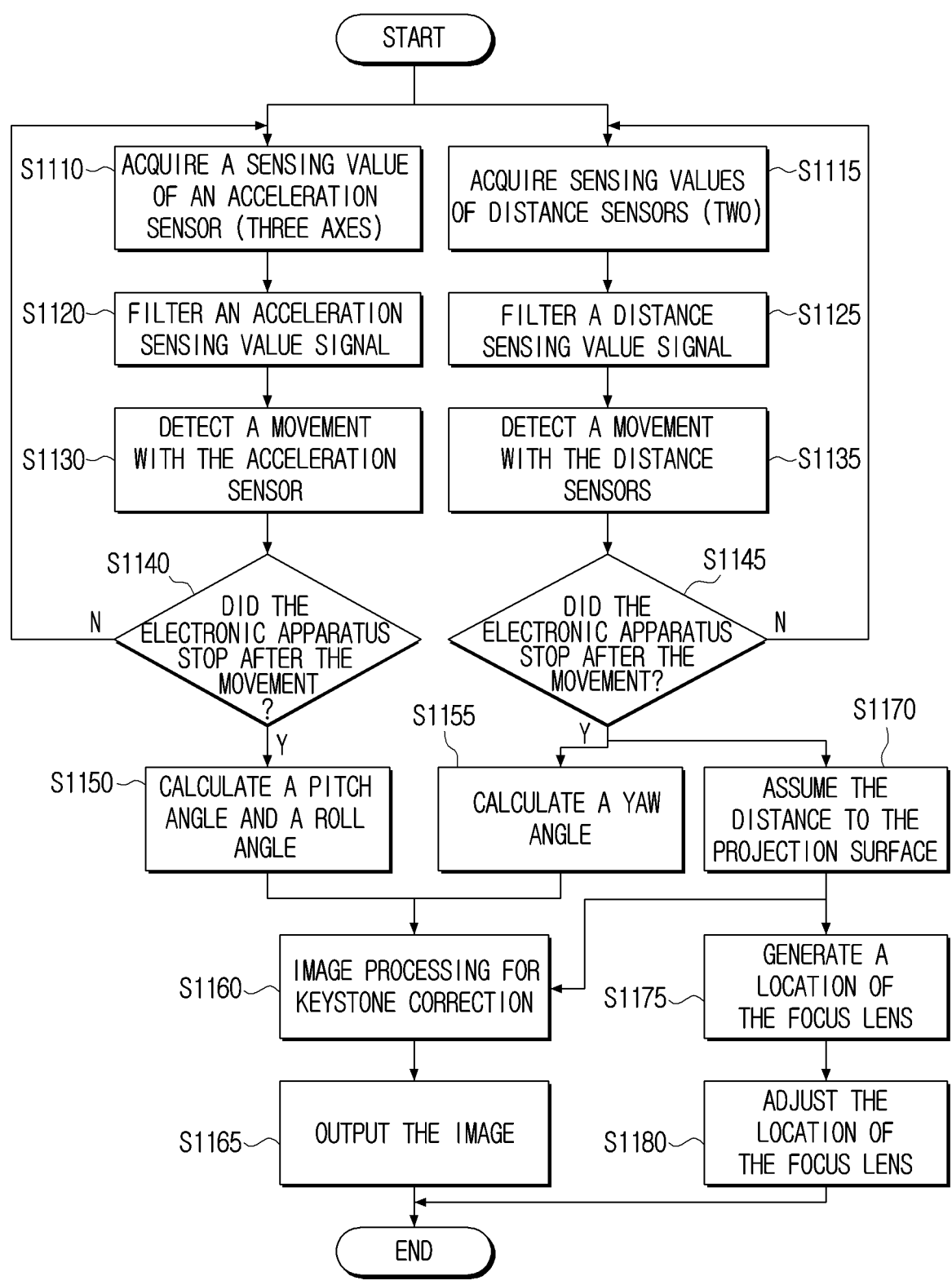
FIG. 11 is a flow chart for illustrating an image processing method of an electronic apparatus according to an embodiment of the disclosure.

FIG. 11 is a flow chart for illustrating an image processing method of an electronic apparatus according to an embodiment of the disclosure.

According to FIG. 11, the electronic apparatus 100 acquires sensing values by using each of the acceleration sensor 181 and the distance sensors 182-1, 182-2 in operations S1110 and S1115. Here, the electronic apparatus 100 may acquire sensing values sequentially or in parallel according to the design method.

When acceleration sensing values are output from the acceleration sensor 181, the electronic apparatus 100 performs filtering for removing noises of the acceleration sensing values in operation S1120. In case the acceleration sensor 181 has three axes, the electronic apparatus 100 reads all of the sensing values of the three-axis acceleration sensor. Here, the electronic apparatus 100 may perform filtering after acquiring acceleration sensor values for a specific time period, or perform filtering in real time.

The electronic apparatus 100 acquires sensing values of the acceleration sensor 181 a plurality of times, and then compares the current measurement value and the previous measurement values and determines whether there is a movement in operation S1130.

Specifically, the electronic apparatus 100 checks sensing values of the acceleration sensor 181 a plurality of times. Accordingly, the electronic apparatus 100 compares the current measurement value and the previous measurement values, and determines whether there is a movement. Although not illustrated in FIG. 11, the electronic apparatus 100 may perform normalizing regarding a difference value by using Formula 17 below.

$$\text{[Formula 17]}$$
$$Norm_{acc} =$$
$$\sqrt{\{A_{bx}(t) - A_{bx}(t-1)\}^2 + (A_{by}(t) - A_{by}(t-1))^2 + \{A_{bz}(t) - A_{bz}(t-1)\}^2}$$

Here, Abx, Aby, Abz are respectively sensing values of the acceleration sensor having x, y, and z axes, and t means time.

If the normalized difference value exceeds a threshold value, the electronic apparatus 100 may determine that there is a movement of the electronic apparatus 100. Even if the tilt is fixed, a sensor output value may be generated according to the surrounding magnetic field or a change of the environment, and thus the threshold value is not necessarily set as 0, but it may be set in consideration of a fine error range. Meanwhile, if a movement of the electronic apparatus 100 is identified, the electronic apparatus 100 may not perform keystone correction until the movement stops.

The electronic apparatus 100 may determine whether the electronic apparatus 100 has been stopped after the movement in operation S1140.

If it is determined that the electronic apparatus 100 has been stopped in operation S1140-Y, the electronic apparatus 100 calculates a pitch angle and a roll angle by using the sensing values of the acceleration sensor 181 in operation S1150. As the method of calculating a pitch angle and a roll angle was described above, overlapping explanation will be omitted.

Meanwhile, when sensing values are acquired in the distance sensors 182-1, 182-2 in operation S1115, the electronic apparatus 100 filters the distance sensing values for removing noises in operation S1125. The electronic apparatus 100 may perform filtering after acquiring distance values for a specific time period, or perform filtering in real time.

The electronic apparatus 100 acquires sensing values of the distance sensors 182-1, 182-2 a plurality of times, and then compares the current measurement value and the previous measurement values and determines whether there is a movement in operation S1135.

In this case, the electronic apparatus 100 may identify the difference in the measurement values by performing normalizing by the method as in Formula 18 below.

$$\text{[Formula 18]}$$
$$Norm_{dist} = \sqrt{\{d_1(t) - d_1(t-1)\}^2 + \{d_2(t) - d_2(t-1)\}^2}.$$

Here, d1 is the sensing value of the first distance sensor 182-1, and d2 is the sensing value of the second distance sensor 182-2, and t means time. If the calculated value exceeds a threshold value, the electronic apparatus 100 determines that there is a movement of the electronic apparatus 100. The threshold value is not necessarily set as 0, but it may be set in consideration of a fine error range. Meanwhile, if a movement of the electronic apparatus 100 is identified, the electronic apparatus 100 may not perform keystone correction until the movement stops.

The electronic apparatus 100 may determine whether the electronic apparatus 100 has been stopped after the movement in operation S1145.

If it is determined that the electronic apparatus 100 has been stopped in operation S1145-Y, the electronic apparatus 100 calculates a yaw angle by using the sensing values of the distance sensors 182-1, 182-2 and the first angle by which the distance sensors 182-1, 182-2 were rotated in operation S1155. As the method of calculating a yaw angle was described above, overlapping explanation will be omitted.

When all of the pitch angle, the roll angle, and the yaw angle are calculated as described above, the electronic apparatus 100 performs an image processing operation for keystone correction in operation S1160. Specifically, the electronic apparatus 100 acquires a projection matrix P that indicates a relation between points on a virtual plane wherein there is no warping and points on the actual projection surface, and pre-warps an image to be projected on the projection surface by using the acquired projection matrix, and acquires an image conversion matrix that makes an image that is possibly in a quadrangle form output on the projection surface. As the image processing method using these matrices was described in detail in the aforementioned parts, overlapping explanation will be omitted.

The electronic apparatus 100 outputs the processed image to the direction of the projection surface 10 in operation S1165.

Also, the electronic apparatus 100 may assume the distance to the projection surface 10 by using the sensing values acquired from the distance sensors 182-1, 182-2 in operation S1170. As the method of assuming the distance to the projection surface 10 was described above, overlapping explanation will be omitted.

The electronic apparatus 100 may generate a location of a focus lens based on the assumed distance to the projection surface 10 in operation S1175, and adjust the location of the focus lens according to the generated location of the lens in operation S1180. By this, the electronic apparatus 100 may perform an auto focusing operation of adjusting the focus of the projection part 110 automatically.

The controlling method of the electronic apparatus 100 illustrated in FIG. 11 may be performed in an electronic apparatus having the configuration as in FIG. 1, but the disclosure is not limited thereto, and the controlling method may be performed in electronic apparatuses having various configurations. Also, in FIG. 2A, it was illustrated that the main body of the electronic apparatus 100 is a quadrangle, but the exterior of the electronic apparatus 100 may also be implemented in various forms. Hereinafter, the exterior and the configuration of the electronic apparatus 100 modified in various forms will be described.

Figure 12:
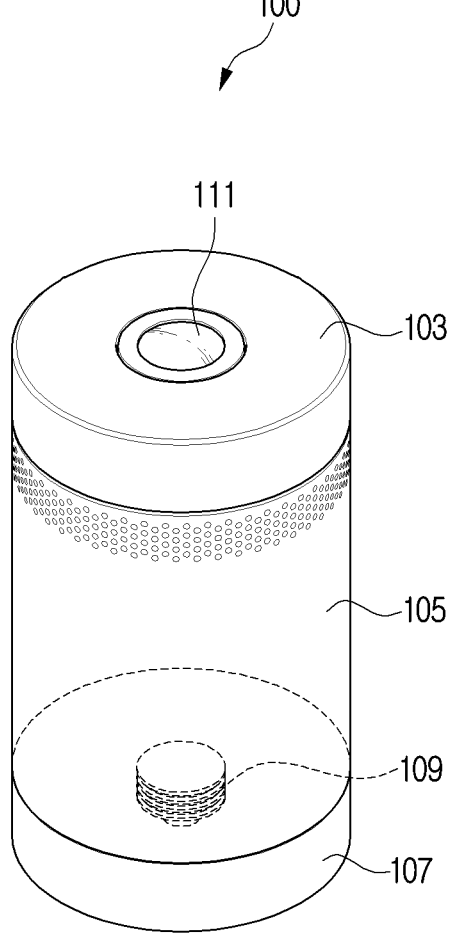
FIG. 12 is a perspective view illustrating an exterior of an electronic apparatus according to an embodiment of the disclosure.

FIG. 12 is a perspective view illustrating the exterior of the electronic apparatus 100 according to an embodiment of the disclosure.

Referring to FIG. 12, the electronic apparatus 100 may include a head 103, a main body 105, a projection lens 111, a connector 109, or a cover 107.

The electronic apparatus 100 may be apparatuses in various forms. In particular, the electronic apparatus 100 may be a projector apparatus that enlarges and projects an image on a wall or a projection surface, and the projector apparatus may be an LCD projector or a digital light processing (DLP) type projector that uses a digital micromirror device (DMD).

Also, the electronic apparatus 100 may be a display apparatus for a household use or an industrial use. Alternatively, the electronic apparatus 100 may be a lighting apparatus used in everyday lives or an acoustic apparatus including an acoustic module, and it may also be implemented as a portable communication apparatus (e.g.: a smartphone), a computer apparatus, a portable multimedia apparatus, a wearable apparatus, or a home appliance, etc. Meanwhile, the electronic apparatus 100 according to an embodiment of the disclosure is not limited to the aforementioned apparatuses, and the electronic apparatus 100 may be implemented as an electronic apparatus 100 equipped with two or more functions of the aforementioned apparatuses. For example, in the electronic apparatus 100, a projector function may be turned off and a lighting function or a speaker function may be turned on according to a manipulation of the processor, and the electronic apparatus 100 may be utilized as a display apparatus, a lighting apparatus, or an acoustic apparatus. Also, it may include a microphone or a communication device, and may be utilized as an AI speaker.

The main body 105 is a housing forming the exterior, and it may support or protect the component parts (e.g., the components illustrated in FIG. 13) of the electronic apparatus 100 arranged inside the main body 105. The shape of the main body 105 may have a structure close to a cylindrical shape, as illustrated in FIG. 12. However, the shape of the main body 105 is not limited thereto, and according to the various embodiments of the disclosure, the main body 105 may be implemented as various geometrical shapes such as a column having polygonal cross sections, a cone, and a sphere.

The size of the main body 105 may be a size that a user can grip by one hand or move, and the main body 105 may be implemented as a subminiature form so as to be easily carried, and it may be implemented as a size that can be held on a table or coupled to a lighting apparatus.

The material of the main body 105 may be implemented as matt metal or a synthetic resin so that it is not smeared with a user's fingerprint or dust. Alternatively, the exterior of the main body 105 may consist of a sleek glossy surface.

In the main body 105, a friction area may be formed in some areas of the exterior of the main body 105 so that a user can grip and move the main body 105. Alternatively, in at least some areas of the main body 105, a bent gripping part or a support 108a (refer to FIG. 14) that a user can grip may be provided.

The projection lens 111 is formed on one surface of the main body 105, and is formed to project a light that passed through the lens array to the outside of the main body 105. The projection lens 111 according to the various embodiments may be a low dispersion-coated optical lens for reducing chromatic aberration. Also, the projection lens 111 may be a convex lens or a condensing lens, and the projection lens 111 according to an embodiment may adjust the focus by adjusting locations of a plurality of sub lenses.

The head 103 may be provided to be coupled to one surface of the main body 105, and support and protect the projection lens 111. The head 103 may be coupled with the main body 105 so as to be swiveled within a predetermined angle range based on one surface of the main body 105.

The head 103 may be automatically or manually swiveled by a user or the processor, and freely adjust the projection angle of the projection lens 111. Alternatively, although not illustrated in the drawings, the head 103 may include a neck that is coupled with the main body 105 and extends from the main body 105, and the head 103 may adjust the projection angle of the projection lens 111 by being tipped or tilted.

The electronic apparatus 100 may project a light or an image to a desired location by adjusting the emission angle of the projection lens 111 while adjusting the direction of the head 103 in a state wherein the location and the angle of the main body 105 are fixed. Also, the head 103 may include a handle that a user can grip after rotating in a desired direction.

On the outer circumferential surface of the main body 105, a plurality of openings may be formed. Through the plurality of openings, audio output from the audio outputter may be output to the outside of the main body 105 of the electronic apparatus 100. The audio outputter may include a speaker, and the speaker may be used for general uses such as reproduction of multimedia or reproduction of recording, output of a voice, etc.

According to an embodiment of the disclosure, a radiation fan (not shown) may be provided inside the main body 105, and when the radiation fan (not shown) is driven, air or heat inside the main body 105 may be discharged through the plurality of openings. Thus, the electronic apparatus 100 may discharge heat generated by the driving of the electronic apparatus 100 to the outside, and prevent the electronic apparatus 100 from being overheated.

The connector 109 may connect the electronic apparatus 100 with an external apparatus and transmit and receive electronic signals, or receive power from the outside. The connector 109 according to an embodiment of the disclosure may be physically connected with an external apparatus. Here, the connector 109 may include an input/output interface, and connect communication with an external apparatus via wire or wirelessly, or receive power. For example, the connector 109 may include an HDMI connection terminal, a USB connection terminal, an SD card accommodation groove, an audio connection terminal, or a power consent. Alternatively, the connector 109 may include a Bluetooth, Wi-Fi or wireless charging connection module that is wirelessly connected with an external apparatus.

Also, the connector 109 may have a socket structure connected with an external lighting apparatus, and may be connected to a socket accommodation groove of the external lighting apparatus and receive power. The size and the specification of the connector 109 in a socket structure may be implemented variously in consideration of an accommodation structure of an external apparatus that can be coupled. For example, according to the international standard E26, the diameter of the joint portion of the connector 109 may be implemented as 26 mm. In this case, the electronic apparatus 100 may be coupled to an external lighting apparatus like a stand in place of a light bulb that is generally used. Meanwhile, the electronic apparatus 100 has a structure that is projected up and down when fastened to a conventional socket located on a ceiling, and in case the electronic apparatus 100 does not rotate by socket coupling, the screen cannot rotate, either. Accordingly, even in case the electronic apparatus 100 is socket-coupled and receives power, in order for the electronic apparatus 100 to rotate, the head 103 may adjust the emission angle by being swiveled on one surface of the main body 105 while the electronic apparatus 100 is socket-coupled to a stand on the ceiling, and accordingly, the screen may be output to a desired location, or the screen may be rotated.

The connector 109 may include a coupling sensor, and the coupling sensor may sense whether the connector 109 and an external apparatus are coupled, a coupled state, or a subject for coupling, and transmit the result to the processor, and the processor may control the driving of the electronic apparatus 100 based on the transmitted sensing values.

The cover 107 may be coupled to and separated from the main body 105, and protect the connector 109 so that the connector 109 is not exposed to the outside at all times. The shape of the cover 107 may have a form that is continued with the main body 105 as illustrated in FIG. 1, or the shape may be implemented to correspond to the shape of the connector 109. The cover 107 may support the electronic apparatus 100, and the electronic apparatus 100 may be used as it is coupled to the cover 107 and coupled to or held on an external holder.

In the electronic apparatus 100 according to the various embodiments, a battery may be provided inside the cover 107. The battery may include, for example, a primary battery that cannot be recharged, a secondary battery that can be recharged, or a fuel cell.

Although not illustrated in the drawings, the electronic apparatus 100 may include a camera module, and the camera module may photograph a still image or a moving image. According to an embodiment, the camera module may include one or more lenses, an image sensor, an image signal processor, or a flash.

Also, although not illustrated in the drawings, the electronic apparatus 100 may include a protection case (not shown) so that the electronic apparatus 100 can be easily carried while being protected. Alternatively, the electronic apparatus 100 may include a stand (not shown) supporting or fixing the main body 105, and a bracket (not shown) that can be coupled to a wall surface or a partition.

Further, the electronic apparatus 100 may be connected with various external apparatuses by using a socket structure, and provide various functions. As an example, the electronic apparatus 100 may be connected with an external camera apparatus by using a socket structure. The electronic apparatus 100 may provide an image stored in the connected camera apparatus or an image that is currently being photographed by using the projection part 110. As another example, the electronic apparatus 100 may be connected with a battery module by using a socket structure, and receive power. Meanwhile, the electronic apparatus 100 may be connected with an external apparatus by using a socket structure, but this is merely an example, and the electronic apparatus 100 may be connected with an external apparatus by using a different interface (e.g., a USB, etc.).

Figure 13:
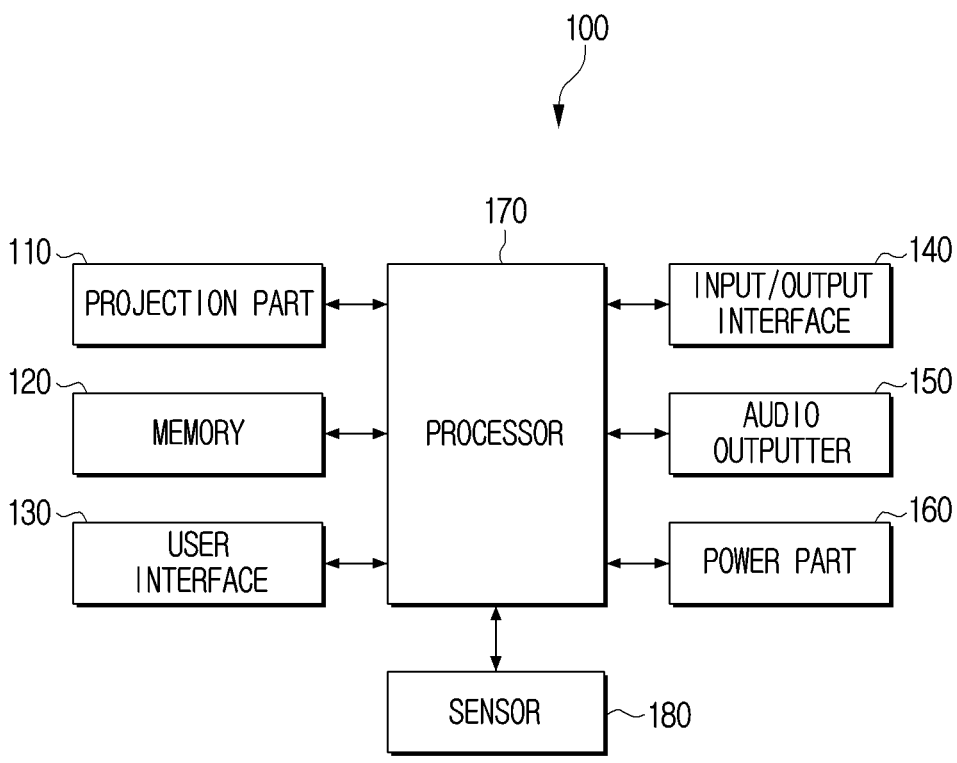
FIG. 13 is a block diagram illustrating a configuration of an electronic apparatus according to an embodiment of the disclosure.

FIG. 13 is a block diagram illustrating a configuration of an electronic apparatus according to an embodiment of the disclosure.

Referring to FIG. 13, the electronic apparatus 100 may include a projection part 110, a memory 120, a user interface 130, an input/output interface 140, an audio outputter 150, a power part 160, and a processor 170. Meanwhile, the components illustrated in FIG. 13 are merely examples, and some components may be omitted, and new components may be added.

The projection part 110 is a component projecting an image to the outside. The projection part 110 according to an embodiment of the disclosure may be implemented by various projection methods (e.g., a cathode-ray tube (CRT) method, a liquid crystal display (LCD) method, a digital light processing (DLP) method, a laser method, etc.). As an example, the CRT method has basically the same principle as a CRT monitor. In the CRT method, an image is enlarged to a lens in front of a cathode-ray tube (CRT), and the image is displayed on a projection surface. According to the number of cathode-ray tubes, the CRT method is divided into an one-tube method and a three-tube method, and in the case of the three-tube method, the method may be implemented while cathode-ray tubes of red, green, and blue colors are separated from one another.

As another example, the LCD method is a method of displaying an image by making a light output from a light source pass through a liquid crystal display. The LCD method is divided into a single-plate method and a three-plate method, and in the case of the three-plate method, a light output from a light source may be divided into red, green, and blue colors in a dichroic mirror (a mirror that reflects only lights of specific colors, and makes the rest pass through), and pass through a liquid crystal display, and then the lights may be gathered in one place.

As still another example, the DLP method is a method of displaying an image by using a digital micromirror device (DMD) chip. A projection part by the DLP method may include a light source, a color wheel, a DMD chip, a projection lens, etc. A light output from the light source may show a color as it passes through the rotating color wheel. The light that passed through the color wheel is input into the DMD chip. The DMD chip includes numerous micromirrors, and reflects the light input into the DMD chip. The projection lens may perform a role of enlarging the light reflected from the DMD chip to an image size.

As still another example, the laser method includes a diode pumped solid state (DPSS) laser and a galvanometer. For a laser outputting various colors, a laser wherein three DPSS lasers are installed for each of RGB colors, and then optical axes are overlapped by using a specific mirror is used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and as a projector generally performs planar scanning, the galvanometer may also be arranged while being divided into x and y axes.

Meanwhile, the projection part 110 may include light sources of various types. For example, the projection part 110 may include at least one light source among a lamp, an LED, and a laser.

The projection part 110 may output images in a 4:3 screen ratio, a 5:4 screen ratio, and a 16:9 wide screen ratio according to the use of the electronic apparatus 100 or the user's setting, etc. Also, the projection part 110 may output images in various resolutions such as WVGA(854*480), SVGA(800*600), XGA(1024*768), WXGA(1180*720), WXGA(1180*800), SXGA(1180*1024), UXGA (1600*1100), Full HD(1920*1080), etc. according to screen ratios.

Meanwhile, the projection part 110 may perform various functions for adjusting an output image by a control of the processor 170. For example, the projection part 110 may perform functions such as zoom, keystone, quick corner (4 corner) keystone, lens shift, etc.

Specifically, the projection part 110 may enlarge or reduce an image according to a distance from the projection surface (a projection distance). That is, a zoom function may be performed according to a distance from the projection surface. Here, the zoom function may include a hardware method of adjusting the size of the screen by moving the lens, and a software method of adjusting the size of the screen by cropping an image, etc. Meanwhile, when the zoom function is performed, adjustment of the focus of an image is needed. For example, methods of adjusting a focus includes a manual focus method, an electric method, etc. The manual focus method means a method of adjusting a focus manually, and the electric method means a method of automatically adjusting a focus by using a motor wherein a projector is included when the zoom function is performed. When performing the zoom function, the projection part 110 may provide a digital zoom function through software, and provide an optical zoom function of performing the zoom function by moving the lens through the driving part.

Also, the projection part 110 may perform a keystone function. As keystone correction was described above, detailed explanation will be omitted.

Meanwhile, the projection part 110 may automatically analyze the surrounding environment and the projection environment without a user input, and provide zoom/keystone/focus functions. Specifically, the projection part 110 may automatically provide the zoom/keystone/focus functions based on a distance between the electronic apparatus 100 and the projection surface detected through sensors (a depth camera, a distance sensor, an infrared sensor, an illumination sensor, etc.), information on the space wherein the electronic apparatus 100 is currently located, information on the light amount of the surroundings, etc.

Also, the projection part 110 may provide a lighting function by using a light source. In particular, the projection part 110 may provide a lighting function by outputting a light source by using an LED. According to an embodiment, the projection part 110 may include one LED, and according to another embodiment, the electronic apparatus may include a plurality of LEDs. Meanwhile, the projection part 110 may output a light source by using a surface-emitting LED depending on implementation examples. Here, the surface-emitting LED may mean an LED having a structure wherein an optical sheet is arranged on the upper side of the LED such that a light source is output while being evenly dispersed. Specifically, if a light source is output through the LED, the light source may be evenly dispersed via the optical sheet, and the light source dispersed via the optical sheet may be introduced into a display panel.

Meanwhile, the projection part 110 may provide a dimming function for adjusting the strength of a light source to a user. Specifically, if a user input for adjusting the strength of a light source is received from a user through the user interface 130 (e.g., a touch display button or a dial), the projection part 110 may control the LED to output the strength of the light source corresponding to the received user input.

Also, the projection part 110 may provide the dimming function based on a content analyzed by the processor 170 without a user input. Specifically, the projection part 110 may control the LED to output the strength of a light source based on information on a content that is currently provided (e.g., the type of the content, the brightness of the content, etc.).

Meanwhile, the projection part 110 may control the color temperature by a control of the processor 170. Here, the processor 170 may control the color temperature based on a content. Specifically, if a content is identified to be output, the processor 170 may acquire color information for each frame of the content determined to be output. Then, the processor 170 may control the color temperature based on the acquired color information for each frame. Here, the processor 170 may acquire at least one main color of the frame based on the color information for each frame. Then, the processor 170 may adjust the color temperature based on the acquired at least one main color. For example, the color temperature that can be adjusted by the processor 170 may be divided into a warm type or a cold type. Here, it is assumed that the frame to be output (referred to as an output frame hereinafter) includes a scene wherein a fire broke out. The processor 170 may identify (or acquire) that the main color is a red color based on the color information included in the current output frame. Then, the processor 170 may identify the color temperature corresponding to the identified main color (the red color). Here, the color temperature corresponding to the red color may be the warm type. Meanwhile, the processor 170 may use an artificial intelligence model to acquire the color information or the main color of the frame. According to an embodiment, the artificial intelligence model may be stored in the electronic apparatus 100 (e.g., the memory 120). According to another embodiment, the artificial intelligence model may be stored in an external server that can communicate with the electronic apparatus 100.

Meanwhile, the electronic apparatus 100 may control the lighting function by being interlocked with an external apparatus. Specifically, the electronic apparatus 100 may receive lighting information from an external apparatus. Here, the lighting information may include at least one of brightness information or color temperature information set in the external apparatus. Here, the external apparatus may mean an apparatus connected to the same network as the electronic apparatus 100 (e.g., an IoT apparatus included in the same home/company network), or an apparatus that can communicate with the electronic apparatus even though it is not connected to the same network as the electronic apparatus 100 (e.g., a remote control server). For example, it is assumed that an external lighting apparatus (IoT apparatus) included in the same network as the electronic apparatus 100 is outputting a red lighting at the brightness of 50. The external lighting apparatus (IoT apparatus) may directly or indirectly transmit lighting information (e.g., information indicating that the red lighting is being output at the brightness of 50) to the electronic apparatus 100. Here, the electronic apparatus 100 may control an output of a light source based on the lighting information received from the external lighting apparatus. For example, if the lighting information received from the external lighting apparatus includes information that the red lighting is output at the brightness of 50, the electronic apparatus 100 may output the red lighting at the brightness of 50.

Meanwhile, the electronic apparatus 100 may control the lighting information based on biometric information. Specifically, the processor 170 may acquire biometric information of a user. Here, the biometric information may include at least one of the body temperature of the user, the cardiac rate, the blood pressure, the respiration, or the electrocardiogram. Here, the biometric information may include various information other than the aforementioned information. As an example, the electronic apparatus may include a sensor for measuring biometric information. The processor 170 may acquire biometric information of a user through a sensor, and control an output of a light source based on the acquired biometric information. As another example, the processor 170 may receive biometric information from an external apparatus through the input/output interface 140. Here, the external apparatus may mean a portable communication apparatus (e.g., a smartphone or a wearable device) of a user. The processor 170 may acquire the biometric information of the user from the external apparatus, and control an output of a light source based on the acquired biometric information. Meanwhile, depending on implementation examples, the electronic apparatus may identify whether a user is sleeping, and if it is identified that the user is sleeping (or preparing to sleep), the processor 170 may control the output of the light source based on the biometric information of the user.

In the memory 120, at least one instruction related to the electronic apparatus 100 may be stored. Also, in the memory 120, an operating system (O/S) for driving the electronic apparatus 100 may be stored. In addition, in the memory 120, various kinds of software programs or applications for the electronic apparatus 100 to operate according to the various embodiments of the disclosure may be stored. Further, in the memory 120, a semiconductor memory such as a flash memory or a magnetic storage medium such as a hard disk may be included.

Specifically, in the memory 120, various kinds of software modules for the electronic apparatus 100 to operate according to the various embodiments of the disclosure may be stored, and the processor 170 may control the operation of the electronic apparatus 100 by executing the various kinds of software modules stored in the memory 120. That is, the memory 120 may be accessed by the processor 170, and reading/recording/correcting/deleting/updating, etc. of data by the processor 170 may be performed.

Meanwhile, in the disclosure, the term memory 120 may be used as a meaning including the memory 120, a ROM (not shown) and a RAM (not shown) inside the processor 170, or a memory card (not shown) (e.g., a micro SD card, a memory stick) installed on the electronic apparatus 100.

The user interface 130 may include input devices in various types. For example, the user interface 130 may include a physical button. Here, the physical button may include function keys, direction keys (e.g., four-direction keys), or a dial button. According to an embodiment, the physical button may be implemented as a plurality of keys. According to another embodiment, the physical button may be implemented as one key. Here, in case the physical button is implemented as one key, the electronic apparatus 100 may receive a user input that the one key is pushed during a threshold time or longer. If a user input that the one key is pushed during the threshold time or longer is received, the processor 170 may perform a function corresponding to the user input. For example, the processor 170 may provide the lighting function based on the user input.

Also, the user interface 130 may receive a user input by using a non-contact-type method. In the case of receiving a user input through a contact-type method, physical force should be transmitted to the electronic apparatus. Accordingly, a method for controlling the electronic apparatus regardless of physical force may be needed. Specifically, the user interface 130 may receive a user gesture, and perform an operation corresponding to the received user gesture. Here, the user interface 130 may receive a user's gesture through a sensor (e.g., an image sensor or an infrared sensor).

In addition, the user interface 130 may receive a user input by using a touch method. For example, the user interface 130 may receive a user input through a touch sensor. According to an embodiment, the touch method may be implemented as a non-contact-type method. For example, the touch sensor may determine whether a user's body approached within a threshold distance. Here, the touch sensor may identify a user input in case the user does not contact the touch sensor. Meanwhile, depending on a different implementation example, the touch sensor may identify a user input wherein the user contacts the touch sensor.

Meanwhile, the electronic apparatus 100 may receive a user input by various methods other than the aforementioned user interface. As an example, the electronic apparatus 100 may receive a user input through an external remote control apparatus. Here, the external remote control apparatus may be a remote control apparatus corresponding to the electronic apparatus 100 (e.g., a control apparatus dedicated to the electronic apparatus), or a portable communication apparatus (e.g., a smartphone or a wearable device) of a user. Here, in a portable communication apparatus of a user, an application for controlling the electronic apparatus may be stored. The portable communication apparatus may acquire a user input through the stored application, and transmit the acquired user input to the electronic apparatus 100. The electronic apparatus 100 may receive the user input from the portable communication apparatus, and perform an operation corresponding to the control command of the user.

Meanwhile, the electronic apparatus 100 may receive a user input by using voice recognition. According to an embodiment, the electronic apparatus 100 may receive a user voice through a microphone included in the electronic apparatus. According to another embodiment, the electronic apparatus 100 may receive a user voice from a microphone or an external apparatus. Specifically, the external apparatus may acquire a user voice through a microphone of the external apparatus, and transmit the acquired user voice to the electronic apparatus 100. The user voice transmitted from the external apparatus may be audio data or digital data converted from audio data (e.g., audio data converted into a frequency domain, etc.). Here, the electronic apparatus 100 may perform an operation corresponding to the received user voice. Specifically, the electronic apparatus 100 may receive audio data corresponding to the user voice through the microphone. Then, the electronic apparatus 100 may convert the received audio data into digital data. Then, the electronic apparatus 100 may convert the converted digital data into text data by using a speech to text (STT) function. According to an embodiment, the speech to text (STT) function may be directly performed in the electronic apparatus 100.

According to another embodiment, the speech to text (STT) function may be performed in an external server. The electronic apparatus 100 may transmit digital data to an external server. The external server may convert the digital data into text data, and acquire control command data based on the converted text data. The external server may transmit the control command data (here, text data may also be included) to the electronic apparatus 100. The electronic apparatus 100 may perform an operation corresponding to the user voice based on the acquired control command data.

Meanwhile, the electronic apparatus 100 may provide the voice recognition function by using one assistance (or an artificial intelligence agent, e.g., Bixby™, etc.), but this is merely an example, and the electronic apparatus 100 may provide the voice recognition function through a plurality of assistances. Here, the electronic apparatus 100 may provide the voice recognition function by selecting one of the plurality of assistances based on a trigger word corresponding to the assistance or a specific key that exists on the remote control.

Meanwhile, the electronic apparatus 100 may receive a user input by using a screen interaction. The screen interaction may mean a function of identifying whether a predetermined event occurs through an image that the electronic apparatus projected on the screen (or the projection surface), and obtaining a user input based on the predetermined event. Here, the predetermined event may mean an event wherein a predetermined object is identified in a specific location (e.g., a location wherein a UI for receiving a user input is projected). Here, the predetermined object may include at least one of a part of a user's body (e.g., a finger), a pointer, or a laser point. If the predetermined object is identified in the location corresponding to the projected UI, the electronic apparatus 100 may identify that a user input selecting the projected UI was received. For example, the electronic apparatus 100 may project a guide image such that a UI is displayed on the screen. Then, the electronic apparatus 100 may identify whether the user selects the projected UI. Specifically, if the predetermined event is identified in the location of the projected UI, the electronic apparatus 100 may identify that the user selected the projected UI. Here, the projected UI may include at least one item. Here, the electronic apparatus 100 may perform spatial analysis for identifying whether the predetermined event is in the location of the projected UI. Here, the electronic apparatus 100 may perform spatial analysis through a sensor (e.g., an image sensor, an infrared sensor, a depth camera, a distance sensor, etc.). By performing spatial analysis, the electronic apparatus 100 may identify whether the predetermined event occurs in the specific location (the location wherein the UI is projected). Then, if it is identified that the predetermined event occurs in the specific location (the location wherein the UI is projected), the electronic apparatus 100 may identify that a user input for selecting the UI corresponding to the specific location was received.

The input/output interface 140 is a component for inputting or outputting at least one of an audio signal or an image signal. The input/output interface 140 may receive input of at least one of an audio signal or an image signal from an external apparatus, and output a control command to the external apparatus.

Meanwhile, the input/output interface 140 according to an embodiment of the disclosure may be implemented as a wired input/output interface of at least one of a High Definition Multimedia Interface (HDMI), a Mobile High-Definition Link (MHL), a Universal Serial Bus (USB), a USB C-type, a Display Port (DP), Thunderbolt, a Video Graphics Array (VGA) port, an RGB port, a D-subminiature (D-SUB), or a Digital Visual Interface (DVI). According to an embodiment, the wired input/output interface may be implemented as an interface inputting or outputting only audio signals and an interface inputting or outputting only image signals, or implemented as one interface inputting or outputting both of audio signals and image signals.

Also, the electronic apparatus 100 may receive data through the wired input/output interface, but this is merely an example, and the electronic apparatus 100 may receive power through the wired input/output interface. For example, the electronic apparatus 100 may receive power from an external battery through a USB C-type, or receive power from a consent through a power adaptor. As another example, the electronic apparatus may receive power from an external apparatus (e.g., a laptop computer or a monitor, etc.) through a DP.

Meanwhile, the input/output interface 140 according to an embodiment of the disclosure may be implemented as a wireless input/output interface that performs communication by at least one communication method among communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both of audio signals and image signals.

Also, implementation may be made such that an audio signal is input through a wired input/output interface, and an image signal is input through a wireless input/output interface. Alternatively, implementation may be made such that an audio signal is input through a wireless input/output interface, and an image signal is input through a wired input/output interface.

The audio outputter 150 is a component outputting audio signals. In particular, the audio outputter 150 may include an audio output mixer, an audio signal processor, and an acoustic output module. The audio output mixer may synthesize a plurality of audio signals to be output into at least one audio signal. For example, the audio output mixer may synthesize an analog audio signal and another analog audio signal (e.g.: an analog audio signal received from the outside) into at least one analog audio signal. The acoustic output module may include a speaker or an output terminal. According to an embodiment, the acoustic output module may include a plurality of speakers, and in this case, the acoustic output module may be arranged inside the main body, and sound emitted while covering at least a part of the vibration plate of the acoustic output module may pass through the waveguide and may be transmitted to the outside of the main body. The acoustic output module may include a plurality of acoustic output units, and as the plurality of acoustic output units are symmetrically arranged on the exterior of the main body, sound may be emitted in all directions, i.e., all directions in 360 degrees.

The power part 160 may receive power from the outside, and provide power to the various components of the electronic apparatus 100. The power part 160 according to an embodiment of the disclosure may receive power through various methods. As an example, the power part 160 may receive power by using the connector 109 as illustrated in FIG. 1. Also, the power part 160 may receive power by using a DC power code of 220V. However, the disclosure is not limited thereto, and the electronic apparatus may receive power by using a USB power code, or receive power by using a wireless charging method.

Also, the power part 160 may receive power by using an internal battery or an external battery. The power part 160 according to an embodiment of the disclosure may receive power through an internal battery. As an example, the power part 160 may charge the power of the internal battery by using at least one of a DC power code of 220V, a USB power code, or a USB C-Type power code, and receive power through the charged internal battery. Also, the power part 160 according to an embodiment of the disclosure may receive power through an external battery. As an example, if connection between the electronic apparatus and an external battery is performed through various wired communication methods such as a USB power code, a USB C-Type power code, a socket groove, etc., the power part 160 may receive power through the external battery. That is, the power part 160 may directly receive power from the external battery, or charge the internal battery through the external battery, and receive power from the charged internal battery.

The power part 160 according to the disclosure may receive power by using at least one among the aforementioned plurality of power supplying methods.

Meanwhile, regarding power consumption, the electronic apparatus 100 may have power consumption of a predetermined value (e.g., 43 W) or lower for the reasons of the socket form and other standards, etc. Here, the electronic apparatus 100 may vary the power consumption so that the power consumption can be reduced when using a battery.

That is, the electronic apparatus 100 may vary the power consumption based on the power supplying method and the power usage amount, etc.

Meanwhile, the electronic apparatus 100 according to an embodiment of the disclosure may provide various smart functions.

Specifically, the electronic apparatus 100 may be connected with a portable terminal apparatus for controlling the electronic apparatus 100, and the screen output at the electronic apparatus 100 may be controlled through a user input that is input at the portable terminal apparatus. As an example, the portable terminal apparatus may be implemented as a smartphone including a touch display, and the electronic apparatus 100 may receive screen data provided at the portable terminal apparatus from the portable terminal apparatus and output the data, and the screen output at the electronic apparatus 100 may be controlled according to a user input that is input at the portable terminal apparatus.

The electronic apparatus 100 may perform connection with the portable terminal apparatus through various communication methods such as Miracast, Airplay, wireless DEX, a remote PC method, etc., and share a content or music provided at the portable terminal apparatus.

Also, connection between the portable terminal apparatus and the electronic apparatus 100 may be performed by various connection methods. As an example, the electronic apparatus 100 may be searched at the portable terminal apparatus and wireless connection may be performed, or the portable terminal apparatus may be searched at the electronic apparatus 100 and wireless connection may be performed. Then, the electronic apparatus 100 may output the content provided at the portable terminal apparatus.

As an example, in a state wherein a specific content or music is being output at the portable terminal apparatus, if the portable terminal apparatus is located near the electronic apparatus, and then a predetermined gesture (e.g., a motion tab view) is detected through the display of the portable terminal apparatus, the electronic apparatus 100 may output the content or music that is being output at the portable terminal apparatus.

As an example, in a state wherein a specific content or music is being output at the portable terminal apparatus, if the portable terminal apparatus becomes close to the electronic apparatus 100 by a predetermined distance or shorter (e.g., a non-contact tab view), or the portable terminal apparatus contacts the electronic apparatus 100 twice at a short interval (e.g., a contact tab view), the electronic apparatus 100 may output the content or music that is being output at the portable terminal apparatus.

In the aforementioned embodiment, it was described that the same screen as the screen that is being provided at the portable terminal apparatus is provided at the electronic apparatus 100, but the disclosure is not limited thereto. That is, if connection between the portable terminal apparatus and the electronic apparatus 100 is constructed, a first screen that is provided at the portable terminal apparatus may be output at the portable terminal apparatus, and a second screen provided at the portable terminal apparatus that is different from the first screen may be output at the electronic apparatus 100. As an example, the first screen may be a screen provided by a first application installed on the portable terminal apparatus, and the second screen may be a screen provided by a second application installed on the portable terminal apparatus. As an example, the first screen and the second screen may be screens different from each other provided at one application installed on the portable terminal apparatus. Also, as an example, the first screen may be a screen including a UI in a form of a remote control for controlling the second screen.

The electronic apparatus 100 according to the disclosure may output a standby screen. As an example, in case connection between the electronic apparatus 100 and an external apparatus was not performed, or in case there is no input received from an external apparatus during a predetermined time, the electronic apparatus 100 may output a standby screen. The conditions for the electronic apparatus 100 to output a standby screen are not limited to the aforementioned examples, and a standby screen may be output by various conditions.

The electronic apparatus 100 may output a standby screen in a form of a blue screen, but the disclosure is not limited thereto. As an example, the electronic apparatus 100 may extract only a form of a specific object from data received from an external apparatus and acquire an atypical object, and output a standby screen including the acquired atypical object.

Figure 14:
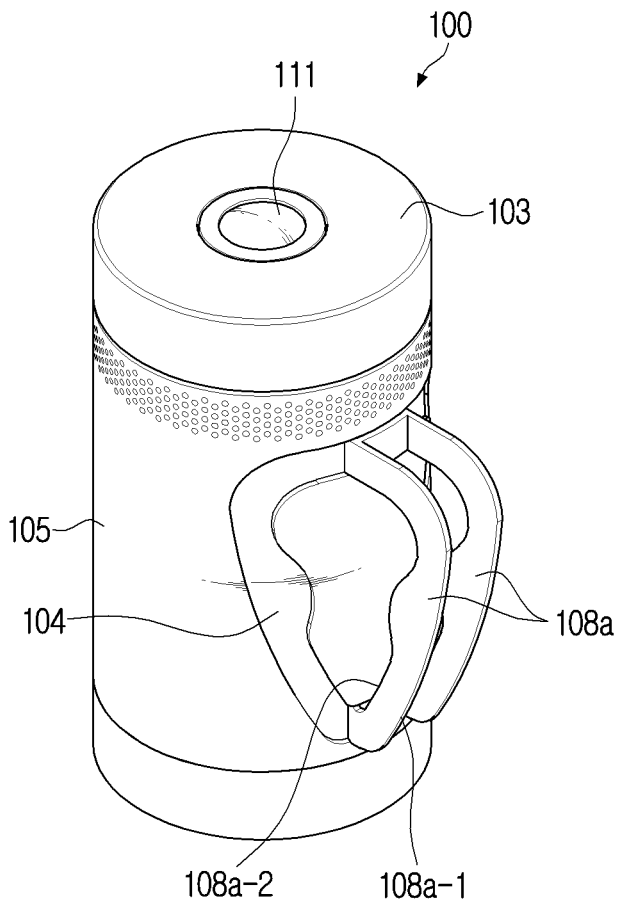
FIG. 14 is a perspective view illustrating an exterior of an electronic apparatus according to other embodiments of the disclosure.

FIG. 14 is a perspective view illustrating the exterior of the electronic apparatus 100 according to other embodiments of the disclosure.

Referring to FIG. 14, the electronic apparatus 100 may include a support (or, it may be referred to as "a handle") 108*a*.

The support 108*a* according to the various embodiments may be a handle or a ring that is provided so that a user can grip or move the electronic apparatus 100. Alternatively, the support 108*a* may be a stand that supports the main body 105 while the main body 105 is laid in the side surface direction.

The support 108*a* may be connected in a hinge structure so that it can be coupled to or separated from the outer circumferential surface of the main body 105, as illustrated in FIG. 14, and it may be selectively separated from or fixed to the outer circumferential surface of the main body 105 depending on a user's needs. The number, shape, or arrangement structure of the support 108*a* may be implemented in various ways without restriction. Also, although not illustrated in the drawings, the support 108*a* may be housed inside the main body 105, and a user can take it out and use it depending on needs, or the support 108*a* may be implemented as a separate accessory, and may be attached to or detached from the electronic apparatus 100.

The support 108*a* may include a first supporting surface 108*a*-1 and a second supporting surface 108*a*-2. The first supporting surface 108*a*-1 may be a surface that faces the outer direction of the main body 105 while the support 108*a* is separated from the outer circumferential surface of the main body 105, and the second supporting surface 108*a*-2 may be a surface that faces the inner direction of the main body 105 while the support 108*a* is separated from the outer circumferential surface of the main body 105.

The first supporting surface 108*a*-1 may get far from the main body 105 as it proceeds from the lower part of the main body 105 to the upper part of the main body 105, and the first supporting surface 108*a*-1 may have a shape that is flat or uniformly curved. In case the electronic apparatus 100 is held such that the outer side surface of the main body 105 contacts the bottom surface, i.e., in case the electronic apparatus 100 is arranged such that the projection lens 110 is toward the front surface direction, the first supporting surface 108*a*-1 may support the main body 105. In an embodiment including two or more supports 108*a*, the emission angle between the head 103 and the projection lens 110 can be adjusted by adjusting the interval or the hinge-opening angle between the two supports 108*a*.

The second supporting surface 108*a*-2 is a surface that contacts a user or an external holding structure when the support 108*a* is supported by the user or the external holding structure, and it may have a shape corresponding to the gripping structure of the user's hand or the external holding structure so that it is not slipped in the case of supporting or moving the electronic apparatus 100. The user may make the projection lens 110 face the front surface direction and fix the head 103, and move the electronic apparatus 100 while gripping the support 108*a*, and use the electronic apparatus 100 like a flashlight.

The support groove 104 is a groove structure that is provided on the main body 105, and that can accommodate the support 108*a* when it is not used, and it may be implemented as a groove structure corresponding to the shape of the support 108*a* on the outer circumferential surface of the main body 105, as illustrated in FIG. 14. Through the support groove 104, the support 108*a* can be kept on the outer circumferential surface of the main body 105 when the support 108*a* is not used, and the outer circumferential surface of the main body 105 can be maintained to be smooth.

Alternatively, the support groove 104 may have a structure of taking the support 108*a* to the outside of the main body 105 in a situation wherein the support 108*a* is kept inside the main body 105 and the support 108*a* is needed. In this case, the support groove 104 may be a structure that is retracted to the inside of the main body 105 so as to accommodate the support 108*a*, and the second supporting surface 108*a*-2 may include a door (not shown) that opens or closes the support groove 104 that adjoins the outer circumferential surface of the main body 105 or that is located separately.

Although not illustrated in the drawings, the electronic apparatus 100 may include various types of accessories that are helpful in using or keeping the electronic apparatus 100. For example, the electronic apparatus 100 may include a protection case (not shown) so that the electronic apparatus 100 can be carried easily while being protected. Alternatively, the electronic apparatus 100 may include a tripod (not shown) that supports or fixes the main body 105, or a bracket (not shown) that is coupled to an outer surface and can fix the electronic apparatus 100.

Figure 15:
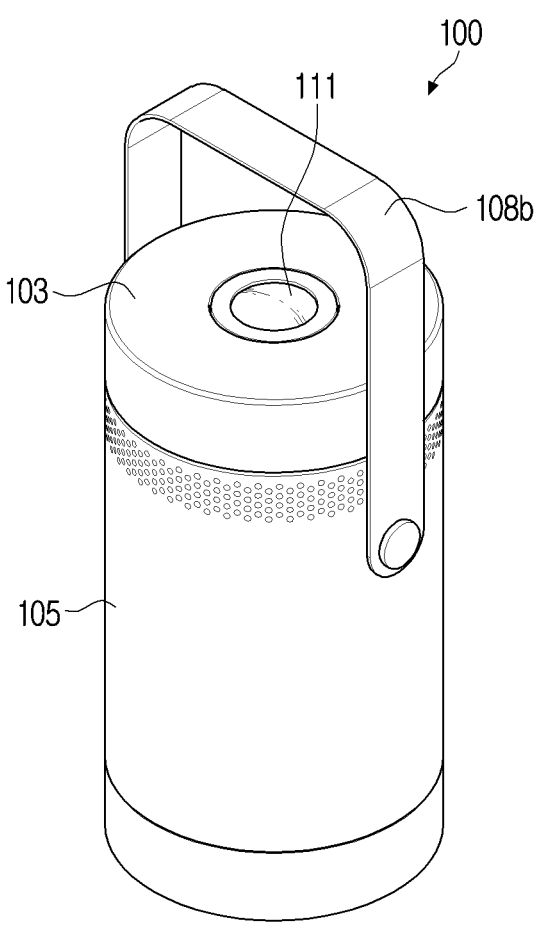
FIG. 15 is a perspective view illustrating an exterior of an electronic apparatus according to still other embodiments of the disclosure.

FIG. 15 is a perspective view illustrating the exterior of the electronic apparatus 100 according to still other embodiments of the disclosure.

Referring to FIG. 15, the electronic apparatus 100 may include a support (or, it may be referred to as "a handle") 108*b*.

The support 108*b* according to the various embodiments may be a handle or a ring that is provided so that a user can grip or move the electronic apparatus 100. Alternatively, the support 108*b* may be a stand that supports the main body 105 to be directed to any angle while the main body 105 is laid in the side surface direction.

Specifically, as illustrated in FIG. 15, the support 108*b* may be connected with the main body 105 at a predetermined point of the main body 105 (e.g., the ⅔-¾ point of the height of the main body). When the support 108 rotates in the direction of the main body, the support 108*b* may support the main body 105 to be directed to any angle while the main body 105 is laid in the side surface direction.

Figure 16:
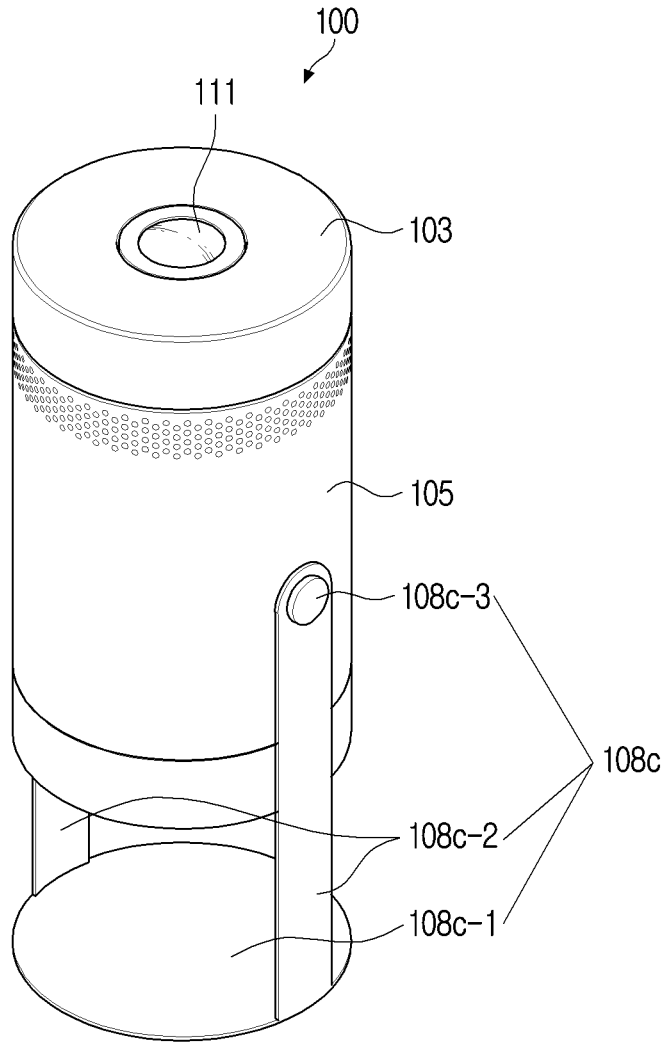
FIG. 16 is a perspective view illustrating an exterior of an electronic apparatus according to still other embodiments of the disclosure.

FIG. 16 is a perspective view illustrating the exterior of the electronic apparatus 100 according to still other embodiments of the disclosure.

Referring to FIG. 16, the electronic apparatus 100 may include a support (or, it may be referred to as "a holder")

108c. The support 108c according to the various embodiments may include a base plate 108c-1 provided to support the electronic apparatus 100 on the ground surface, and two supporting members 108c-2 connecting the base plate 108c-1 and the main body 105.

According to an embodiment of the disclosure, the heights of the two supporting members 108c-2 are the same, and thus one cross section of each of the two supporting members 108c-2 may be coupled or separated by the groove provided on one outer circumferential surface of the main body 105 and the hinge members 108c-3.

The two supporting members may be hinge-coupled to the main body 105 at the predetermined point of the main body 105 (e.g., the ⅓-¾ point of the height of the main body).

When the two supporting members and the main body are coupled by the hinge members 108c-3, the main body 105 may be rotated based on a virtual horizontal axis formed by the two hinge members 108c-3, and the emission angle of the projection lens 110 may be adjusted.

Figure 17A:
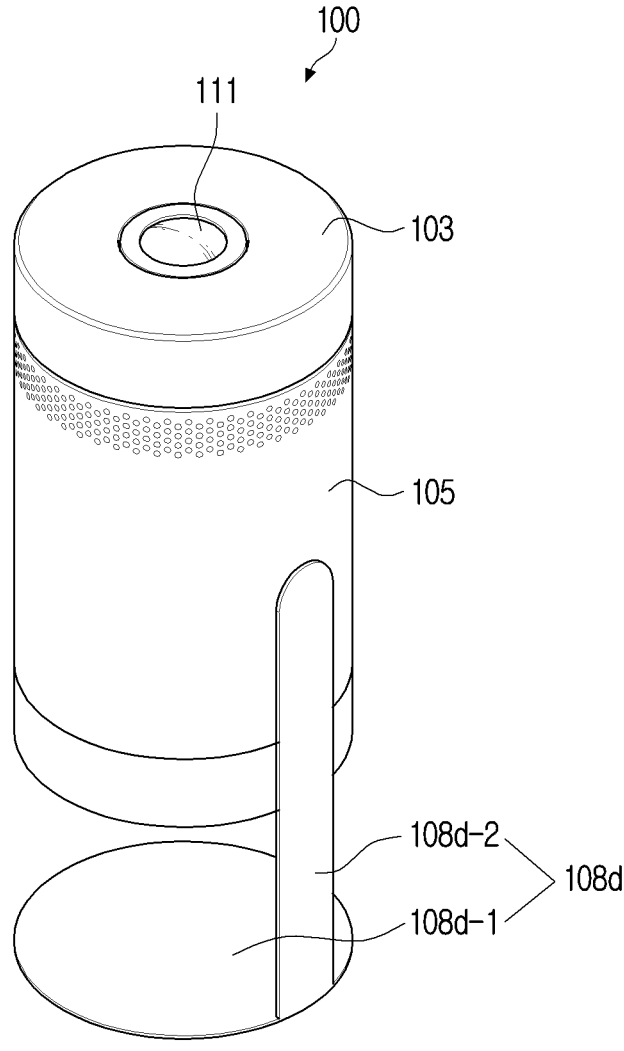
FIG. 17A is a perspective view illustrating an exterior of an electronic apparatus according to still other embodiments of the disclosure.
Figure 17B:
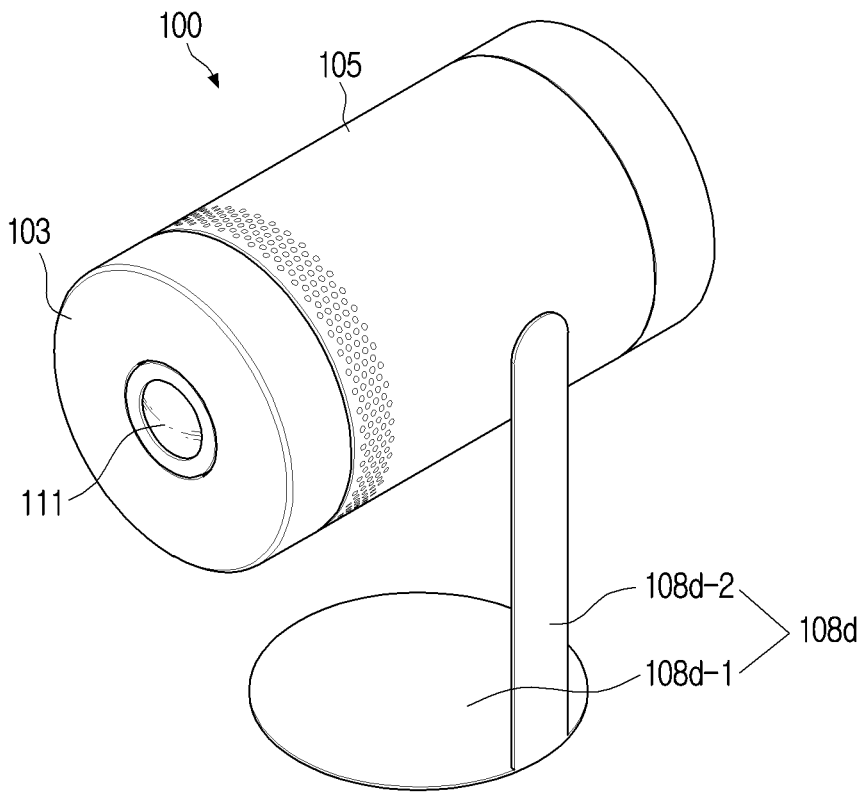
FIG. 17B is a perspective view illustrating a state wherein the electronic apparatus in FIG. 17A has been rotated.

FIG. 16 illustrates an embodiment wherein the two supporting members 108c-2 are connected with the main body 105, but the disclosure is not limited thereto, and one supporting member and the main body 105 may be connected by one hinge member as in FIG. 17A and FIG. 17B.

FIG. 17A is a perspective view illustrating the exterior of the electronic apparatus 100 according to still other embodiments of the disclosure.

FIG. 17B is a perspective view illustrating a state wherein the electronic apparatus 100 in FIG. 17A rotated.

Referring to FIG. 17A and FIG. 17B, the support 108d according to the various embodiments may include a base plate 108d-1 provided to support the electronic apparatus 100 on the ground surface, and one supporting member 108d-2 connecting the base plate 108d-1 and the main body 105.

Also, the cross section of the one supporting member 108d-2 may be coupled or separated by the groove provided on one outer circumferential surface of the main body 105 and the hinge member (not shown).

When the one supporting member 108d-2 and the main body 105 are coupled by the one hinge member (not shown), the main body 105 may be rotated based on a virtual horizontal axis formed by the one hinge member (not shown) as in FIG. 17B.

Meanwhile, the supports illustrated in FIG. 14, FIG. 15, FIG. 16, FIG. 17A, and FIG. 17B are merely examples, and the electronic apparatus 100 can obviously include supports in various locations or forms.

In case the electronic apparatus is manufactured in a cylindrical form as described in FIG. 12 to FIG. 17B, the distance sensors may be arranged in a form of enclosing the surroundings of the projection lens 111. In this case, distance values measured at the distance sensors may all vary according to the tilting or warping of the electronic apparatus, and accordingly, if an average value of such distance values is calculated, the distance from the center of the projection lens 111 to the projection surface can be calculated. Also, if the locations of each distance sensor and the distance among the sensors, and the sensing values of each sensor are comprehensively considered, the tilting may be assumed therefrom. The processor may perform a keystone correction by using the assumed tilting, distance, etc.

In case a program code for performing a controlling method according to the various embodiments as described above is installed on an electronic apparatus, the electronic apparatus can perform the aforementioned method by executing the program code. For example, if a program code for sequentially performing the operations of calculating a first rotation angle and a second rotation angle for the direction of gravity of the electronic apparatus by using the acceleration sensor, calculating a third rotation angle of the electronic apparatus for the projection surface by using the plurality of distance sensors, and performing keystone correction based on the first to third rotation angles is installed on the electronic apparatus, the electronic apparatus can perform an accident reporting task.

Such a program code may be constituted as one application, and distributed on-line or in a state of being loaded on a recording medium, or it may be distributed in a state of being loaded on an electronic apparatus in a form of firmware. An electronic apparatus wherein such an application is installed can perform the aforementioned various image processing methods.

Also, the various embodiments as described above may be implemented in one apparatus as an integrated form or by being combined according to each of some embodiments, or they may be separately implemented according to each embodiment.

A program code as described above may be distributed while being recorded in computer-readable media in various types such as a ROM, a RAM, a memory chip, a memory card, an external hard, a hard, a CD, a DVD, a magnetic disc, or a magnetic tape, etc. An apparatus which downloaded such a program code on-line can also perform the aforementioned various operations.

So far, the disclosure has been described with reference to the accompanying drawings, but the scope of the disclosure is intended to be determined by the appended claims, and is not intended to be interpreted as being limited to the aforementioned embodiments and/or drawings. Also, it should be clearly understood by a person having ordinary knowledge in the art that various alterations, modifications, and amendments of the disclosure may be made within the scope of the idea of the disclosure described in the claims.

What is claimed is:

1. An electronic apparatus comprising:
a projection part;
an acceleration sensor;
a plurality of distance sensors arranged on one surface of the electronic apparatus, the one surface facing a projection surface;
a memory storing at least one instruction; and
a processor configured to:
control the projection part to project an image,
detect information on a movement of the electronic apparatus by using at least one of the acceleration sensor or the plurality of distance sensors,
based on determining from the information on a movement of the electronic apparatus, that the electronic apparatus is in a stopped state after having moved, acquire information on a posture of the electronic apparatus based on sensing values acquired through the acceleration sensor and the plurality of distance sensors, and acquire information on a distance between the electronic apparatus and the projection surface based on sensing values acquired through the plurality of distance sensors, and
perform keystone correction for the image based on the information on the posture of the electronic apparatus and perform auto-focusing of the image based on the distance between the electronic apparatus and the projection surface.

2. The electronic apparatus of claim 1,
wherein the plurality of distance sensors are arranged side by side on a left side and a right side on the one surface, and are arranged to be rotated by a first angle to face one another.

3. The electronic apparatus of claim 2,
wherein the processor is further configured to:
  calculate a first rotation angle and a second rotation angle for the direction of gravity of the electronic apparatus based on the sensing values acquired by using the acceleration sensor, and
  calculate a third rotation angle of the electronic apparatus for the projection surface based on the sensing values acquired by using the plurality of distance sensors and the first angle, and
wherein the first rotation angle is a pitch angle,
the second rotation angle is a roll angle, and
the third rotation angle is a yaw angle.

4. The electronic apparatus of claim 2,
wherein the first angle is an angle by which the plurality of distance sensors are rotated such that lights output by the plurality of distance sensors are located within the projection surface, and is an angle by which the plurality of distance sensors are rotated such that lights output by the plurality of distance sensors intersect one another before reaching the projection surface.

5. The electronic apparatus of claim 1,
wherein the plurality of distance sensors are arranged to be rotated by a second angle in an upper direction or a lower direction to be toward a center of the projection surface.

6. The electronic apparatus of claim 5,
wherein the processor is further configured to:
  calculate a first distance between a center of the plurality of distance sensors and the center of the projection surface by using the sensing values acquired through the plurality of distance sensors, and
  calculate a straight distance from the center of the plurality of distance sensors to the projection surface by using the first distance and the second angle.

7. The electronic apparatus of claim 6,
wherein the processor is further configured to:
  perform auto-focusing of the image by moving a predetermined location of a focus lens by using the straight distance.

8. The electronic apparatus of claim 1, wherein the plurality of distance sensors are arranged to be rotated on the one surface of the electronic apparatus.

9. A method for controlling an electronic apparatus including an acceleration sensor and a plurality of distance sensors arranged on one surface facing a projection surface, the method comprising:
  projecting an image;
  detecting information on a movement of the electronic apparatus by using at least one of the acceleration sensor or the plurality of distance sensors;
  based on determining from the information on a movement of the electronic apparatus, that the electronic apparatus is in a stopped state after having moved, acquiring information on a posture of the electronic apparatus based on sensing values acquired through the acceleration sensor and the plurality of distance sensors, and acquiring information on a distance between the electronic apparatus and the projection surface based on sensing values acquired through the plurality of distance sensors; and
  performing keystone correction for the image based on the information on the posture of the electronic apparatus and performing auto-focusing of the image based on the distance between the electronic apparatus and the projection surface.

10. The controlling method of claim 9,
wherein the plurality of distance sensors are arranged side by side on a left side and a right side on the one surface, and are arranged to be rotated by a first angle to face one another.

11. The controlling method of claim 10,
wherein the acquiring comprises:
calculating a first rotation angle and a second rotation angle for the direction of gravity of the electronic apparatus based on the sensing values acquired by using the acceleration sensor; and
calculating a third rotation angle of the electronic apparatus for the projection surface based on the sensing values acquired by using the plurality of distance sensors and the first angle, and
wherein the first rotation angle is a pitch angle,
the second rotation angle is a roll angle, and
the third rotation angle is a yaw angle.

12. The controlling method of claim 10,
wherein the first angle is an angle by which the plurality of distance sensors are rotated such that lights output by the plurality of distance sensors are located within the projection surface, and is an angle by which the plurality of distance sensors are rotated such that lights output by the plurality of distance sensors intersect one another before reaching the projection surface.

13. The controlling method of claim 9,
wherein the plurality of distance sensors are arranged to be rotated by a second angle in an upper direction or a lower direction to be toward a center of the projection surface.

14. The controlling method of claim 13,
wherein the acquiring comprises:
  calculating a first distance between a center of the plurality of distance sensors and the center of the projection surface by using the sensing values acquired through the plurality of distance sensors, and
  calculating a straight distance from the center of the plurality of distance sensors to the projection surface by using the first distance and the second angle.

15. The controlling method of claim 14,
wherein the control method comprises:
  performing auto-focusing of the image by moving a predetermined location of a focus lens by using the straight distance.

16. The controlling method of claim 9, wherein the plurality of distance sensors are arranged to be rotated on the one surface.

* * * * *